US009767524B2

(12) United States Patent
Hastings et al.

(10) Patent No.: US 9,767,524 B2
(45) Date of Patent: *Sep. 19, 2017

(54) INTERACTION WITH VIRTUAL OBJECTS CAUSING CHANGE OF LEGAL STATUS

(71) Applicant: Microsoft Technology Licensing, LLC, Redmond, WA (US)

(72) Inventors: Ryan L. Hastings, Seattle, WA (US); Stephen G. Latta, Seattle, WA (US); Benjamin I. Vaught, Seattle, WA (US); Darren Bennett, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 116 days.

This patent is subject to a terminal disclaimer.

(21) Appl. No.: 14/715,199

(22) Filed: May 18, 2015

(65) Prior Publication Data

US 2015/0254793 A1  Sep. 10, 2015

Related U.S. Application Data

(63) Continuation of application No. 13/212,673, filed on Aug. 18, 2011, now Pat. No. 9,038,127.

(30) Foreign Application Priority Data

Aug. 9, 2011 (AU) ................ 2011205223

(51) Int. Cl.
*H04L 29/06* (2006.01)
*G06Q 50/18* (2012.01)
(Continued)

(52) U.S. Cl.
CPC ........... *G06Q 50/184* (2013.01); *G06F 3/011* (2013.01); *G06F 21/10* (2013.01); *G06T 2219/024* (2013.01); *H04L 67/38* (2013.01)

(58) Field of Classification Search
CPC ........ G06F 21/10; G06F 3/011; G06F 21/604; G06F 21/62; G06F 21/6209;
(Continued)

(56) References Cited

U.S. PATENT DOCUMENTS 5,502,481 A  3/1996 Dentinger et al.
6,842,175 B1  1/2005 Schmalstieg et al.
(Continued)

FOREIGN PATENT DOCUMENTS

EP  1435737 A1  7/2004
EP  1710002     10/2006
(Continued)

OTHER PUBLICATIONS

Alan Rea, "Security in Virtual Worlds, 3D Webs, and Immersive Environments: Models for Development, Interaction, and Management", Western Michigan University, Information Science Reference, Hershey, New York, Nov. 30, 2010, pp. 168-207.*

(Continued)

*Primary Examiner* — Edward Zee
*Assistant Examiner* — Chi Nguy
(74) *Attorney, Agent, or Firm* — Vierra Magen Marcus LLP

(57) ABSTRACT

Technology is provided for transferring a right to a digital content item based on one or more physical actions detected in data captured by a see-through, augmented reality display device system. A digital content item may be represented by a three-dimensional (3D) virtual object displayed by the device system. A user can hold the virtual object in some examples, and transfer a right to the content item the object represents by handing the object to another user within a defined distance, who indicates acceptance of the right based upon one or more physical actions including taking hold of the transferred object. Other examples of physical actions
(Continued)

performed by a body part of a user may also indicate offer and acceptance in the right transfer. Content may be transferred from display device to display device while rights data is communicated via a network with a service application executing remotely.

16 Claims, 22 Drawing Sheets

(51) Int. Cl.
G06F 3/01 (2006.01)
G06F 21/10 (2013.01)
(58) Field of Classification Search
CPC ............ G06F 21/6218; H04L 67/38; G06T 2219/024; G06Q 50/184
See application file for complete search history.

(56) References Cited

U.S. PATENT DOCUMENTS

| | | | |
|---|---|---|---|
| 6,968,334 | B2 | 11/2005 | Salmenkaita |
| 7,340,438 | B2 | 3/2008 | Nordman |
| 7,532,196 | B2 | 5/2009 | Hinckley |
| 7,690,042 | B2 | 3/2010 | Rantalahti et al. |
| 7,843,471 | B2 | 11/2010 | Doan |
| 7,849,420 | B1 | 12/2010 | Amidon et al. |
| 7,890,638 | B2 | 2/2011 | Benco et al. |
| 8,743,145 | B1 | 6/2014 | Price |
| 9,111,326 | B1 | 8/2015 | Worley, III et al. |
| 2001/0044858 | A1 | 11/2001 | Rekimoto |
| 2002/0149583 | A1 | 10/2002 | Segawa et al. |
| 2004/0030651 | A1 | 2/2004 | Kim et al. |
| 2005/0004875 | A1 | 1/2005 | Kontio et al. |
| 2005/0197846 | A1 | 9/2005 | Pezaris |
| 2006/0050070 | A1 | 3/2006 | Matsui |
| 2006/0115130 | A1 | 6/2006 | Kozlay |
| 2006/0143133 | A1 | 6/2006 | Medvinsky |
| 2006/0227151 | A1 | 10/2006 | Bannai |
| 2006/0256110 | A1 | 11/2006 | Okuno et al. |
| 2007/0081726 | A1 | 4/2007 | Westerman |
| 2008/0010457 | A1 | 1/2008 | Lee et al. |
| 2008/0082448 | A1 | 4/2008 | Meijer et al. |
| 2008/0103977 | A1 | 5/2008 | Khosravy et al. |
| 2008/0148363 | A1 | 6/2008 | Gilder et al. |
| 2008/0195956 | A1 | 8/2008 | Baron |
| 2008/0211771 | A1 | 9/2008 | Richardson |
| 2008/0228607 | A1 | 9/2008 | Jung et al. |
| 2008/0256646 | A1 | 10/2008 | Strom et al. |
| 2009/0100076 | A1 | 4/2009 | Hamilton, II et al. |
| 2009/0125590 | A1 | 5/2009 | Hayano et al. |
| 2009/0158206 | A1 | 6/2009 | Myllyla |
| 2009/0187389 | A1 | 7/2009 | Dobbins et al. |
| 2009/0187933 | A1 | 7/2009 | Ritter et al. |
| 2009/0217211 | A1 | 8/2009 | Hildreth et al. |
| 2009/0233548 | A1 | 9/2009 | Andersson et al. |
| 2009/0243968 | A1 | 10/2009 | Nakazawa |
| 2009/0286570 | A1 | 11/2009 | Pierce |
| 2009/0287490 | A1 | 11/2009 | Cragun et al. |
| 2009/0289955 | A1 | 11/2009 | Douris et al. |
| 2009/0300775 | A1 | 12/2009 | Chu et al. |
| 2010/0010826 | A1 | 1/2010 | Rosenthal |
| 2010/0197399 | A1 | 8/2010 | Geiss |
| 2010/0199232 | A1 | 8/2010 | Mistry |
| 2010/0204984 | A1 | 8/2010 | Yang et al. |
| 2010/0250704 | A1 | 9/2010 | Kittel |
| 2010/0303289 | A1 | 12/2010 | Polzin |
| 2010/0306099 | A1* | 12/2010 | Hirson ............ G06Q 20/10 705/38 |
| 2010/0306647 | A1 | 12/2010 | Zhang et al. |
| 2010/0306715 | A1 | 12/2010 | Geisner et al. |
| 2010/0332668 | A1 | 12/2010 | Shah et al. |
| 2011/0010675 | A1* | 1/2011 | Hamilton, II ....... G06F 21/6218 715/850 |
| 2011/0107429 | A1 | 5/2011 | Marilly et al. |
| 2011/0112934 | A1 | 5/2011 | Ishihara |
| 2011/0126272 | A1 | 5/2011 | Betzler et al. |
| 2011/0181497 | A1 | 7/2011 | Raviv |
| 2011/0205242 | A1 | 8/2011 | Friesen |
| 2011/0205243 | A1* | 8/2011 | Matsuda ............ G06F 3/011 345/633 |
| 2011/0247077 | A1 | 10/2011 | Nguyen et al. |
| 2011/0316845 | A1 | 12/2011 | Roberts et al. |
| 2012/0019557 | A1 | 1/2012 | Aronsson et al. |
| 2012/0062445 | A1 | 3/2012 | Haddick et al. |
| 2012/0083244 | A1 | 4/2012 | Verthein et al. |
| 2012/0204222 | A1 | 8/2012 | Bodi et al. |
| 2012/0218263 | A1 | 8/2012 | Meier et al. |
| 2012/0270578 | A1 | 10/2012 | Feghali |
| 2012/0303610 | A1 | 11/2012 | Zhang |
| 2013/0024577 | A1 | 1/2013 | Krishnaswamy et al. |
| 2013/0169682 | A1 | 7/2013 | Novak et al. |
| 2015/0095158 | A1 | 4/2015 | Nasserbakht et al. |

FOREIGN PATENT DOCUMENTS

| | | |
|---|---|---|
| KR | 20110107542 | 10/2011 |
| WO | 9605532 A1 | 2/1996 |
| WO | 2007015184 A2 | 2/2007 |
| WO | 2011045276 | 4/2011 |
| WO | 2013023706 A1 | 2/2013 |

OTHER PUBLICATIONS

Office Action dated Nov. 19, 2015 in U.S. Appl. No. 12/689,453, 67 pages.
Collaborative Augmented Reality for Outdoor Navigation and Information Browsing, (pp. 31-41), Reitmayr, G. & Schmalstieg, D., (2004).
Response to Office Action filed Jul. 17, 2016 in U.S. Appl. No. 13/689,453, 12 pages.
Office Action dated Aug. 8, 2016 in U.S. Appl. No. 13/689,453, 44 pages.
Response to Office Action filed Sep. 26, 2016 in U.S. Appl. No. 13/689,453, 8 pages.
Response to Office Action filed Jul. 15, 2016 in U.S. Appl. No. 13/689,471, 11 pages.
Notice of Allowance dated Aug. 26, 2016 in U.S. Appl. No. 13/689,471, 17 pages.
Notice of Allowance dated Oct. 5, 2016 in U.S. Appl. No. 13/689,453, 12 pages.
Response to Office Action filed Jun. 29, 2015 in U.S. Appl. No. 12/689,453, 10 pages.
Response to Office Action filed Nov. 5, 2013 in U.S. Appl. No. 12/689,453, 8 pages.
Office Action dated Mar. 14, 2014 in U.S. Appl. No. 12/689,453, 12 pages.
Response to Office Action filed Jun. 10, 2014 in U.S. Appl. No. 12/689,453, 10 pages.
International Search Report and Written Opinion dated Nov. 29, 2012 in International Patent Application No. PCT/US2012/051954, 9 pages.
International Search Report and Written Opinion dated Jan. 14, 2013 in International Patent Application No. PCT/US2012/052136, 9 pages.
English translation of Abstract for WO2011045276 published Apr. 21, 2011.
English translation of Abstract for KR20110107542 published Oct. 4, 2011.
First Office Action dated Aug. 5, 2013 in U.S. Appl. No. 13/689,453, priority date Aug. 24, 2011.
Response to Australian Office Action dated Aug. 7, 2012 in Australian Patent Application No. AU2011205223, 11 pages.
Email from AU Patent Office dated Nov. 6, 2011 regarding Australian Patent Application No. 2011205223, 1 page.
Voluntary Amendment under Section 104 received Nov. 12, 2012 by IP Australia in Australian Patent Application No. 2011205223, 5 pages.

(56) References Cited

OTHER PUBLICATIONS

Page 6050 of Supplement to the Australian Official Journal of Patents, vol. 26, No. 47, Dec. 6, 2012 indicating Amendment of Nov. 12, 2012 has been entered for Australian Patent Application No. 2011205223, 1 page.
Consideration of a Request to Amend a Patent Request, Complete Specification or other Filed Document by IP Australia indicating no adverse report for the Voluntary Amendments under Section 104 received Nov. 12, 2012 for Australian Patent Application No. 2011205223, 2 pages.
Letter dated Nov. 26, 2012 from IP Australia indicating valid request for leave to amend and publication of request in the Supplement to the Australian Official Journal of Patents on Dec. 6, 2012 for Australian Patent Application No. 2011205223, 1 page.
U.S. Appl. No. 13/689,453, filed Nov. 29, 2012.
U.S. Appl. No. 13/689,471, filed Nov. 29, 2012.
Letter from IP Australia dated Mar. 15, 2013 indicating allowance of amendments made Nov. 12, 2012 and their incorporation in the Specification on file for Australian Patent Application No. 2011205223, 7 pages.
Australian Office Action dated Mar. 7, 2012, Australian Patent Application No. 2011205223, filed Aug. 9, 2011, 4 pages.
Response to Australian Office Action dated May 28, 2012, Australian Patent Application No. AU2011205223, filed Aug. 9, 2011, 24 pages.
Australian Office Action dated Jun. 25, 2012, Australian Patent Application No. AU2011205223, filed Aug. 9, 2011, 3 pages.
Notice of Acceptance dated Aug. 31, 2012 in Australian Patent Application No. 2011205223, 3 pages.
Notification of Error with submission of corrected replacement p. 72 dated Oct. 23, 2012 in Australian Patent Application No. 2011205223, 2 pages.
U.S. Appl. No. 13/216,153, filed Aug. 23, 2011.
U.S. Appl. No. 13/216,647, filed Aug. 24, 2011.
Notice of Allowance and Fees Due in U.S. Appl. No. 13/212,673 mailed Jan. 21, 2015.
Non-Final Rejection in U.S. Appl. No. 13/212,673 mailed May 10, 2013.
Final Rejection in U.S. Appl. No. 13/212,673 mailed Dec. 6, 2013.
Amendment in U.S. Appl. No. 13/212,6373 mailed Mar. 6, 2014.
Amendment in U.S. Appl. No. 13/212,673 mailed Nov. 12, 2013.
Amendment in U.S. Appl. No. 13/212,673 mailed Oct. 24, 2012.
Advisory Action in U.S. Appl. No. 13/212,673 mailed Mar. 20, 2014.
Response to Office Action filed Feb. 26, 2016 in U.S. Appl. No. 13/689,453, 11 pages.
Office Action dated Apr. 11, 2016 in U.S. Appl. No. 13/689,453, 30 pages.
Office Action dated Apr. 15, 2016 in U.S. Appl. No. 13/689,471, 133 pages.
U.S. Appl. No. 15/389,098, filed Dec. 22, 2016.

* cited by examiner

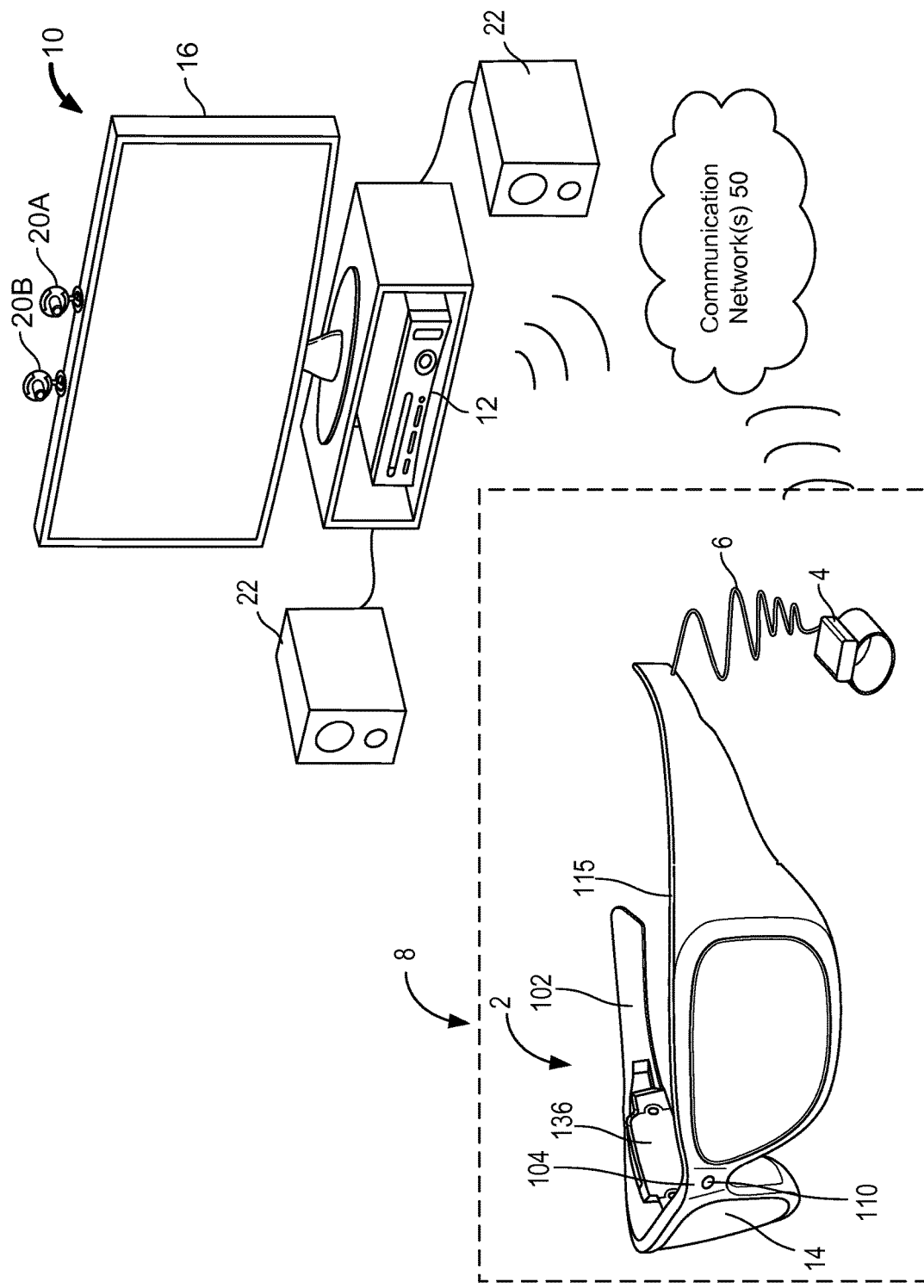

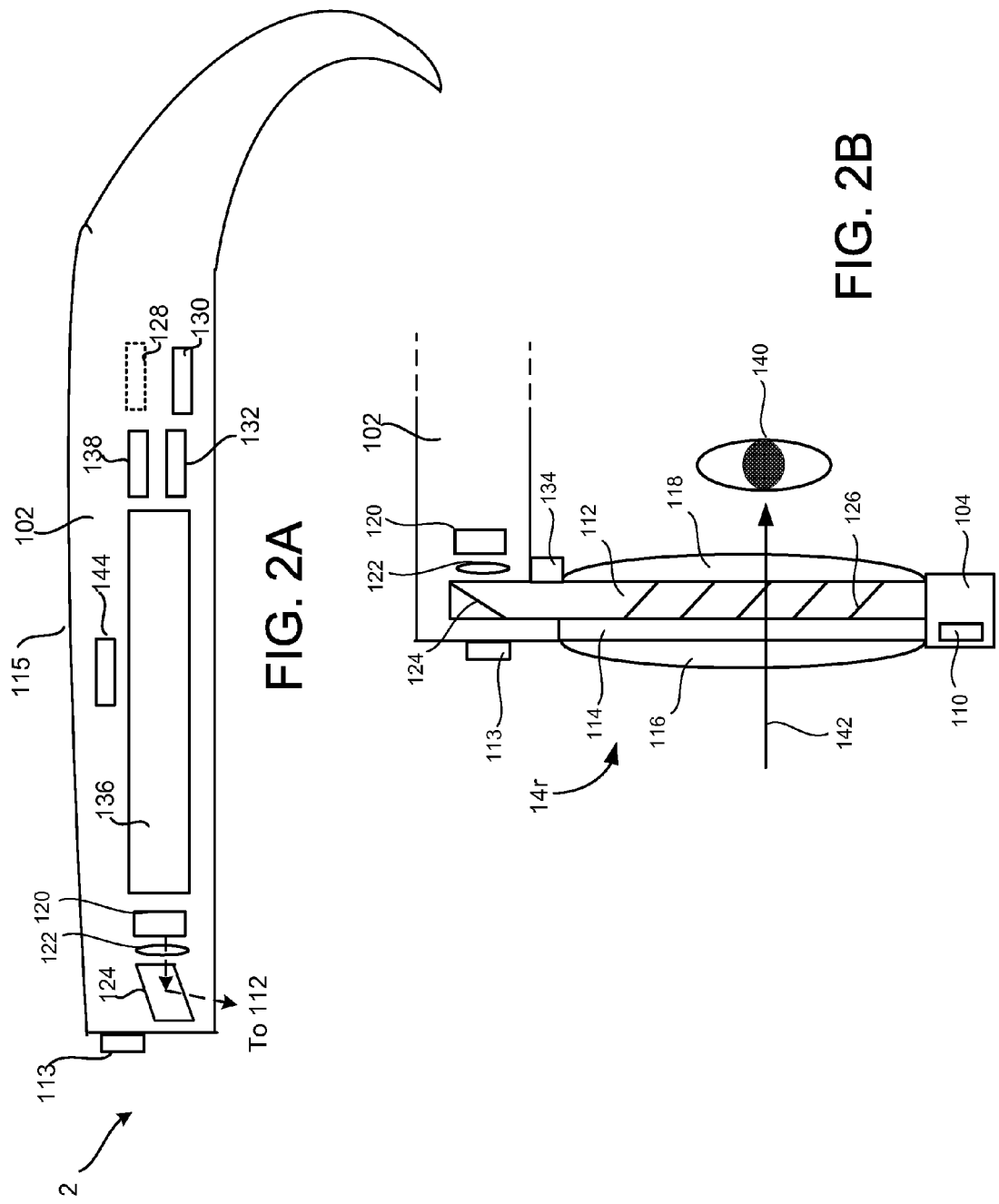

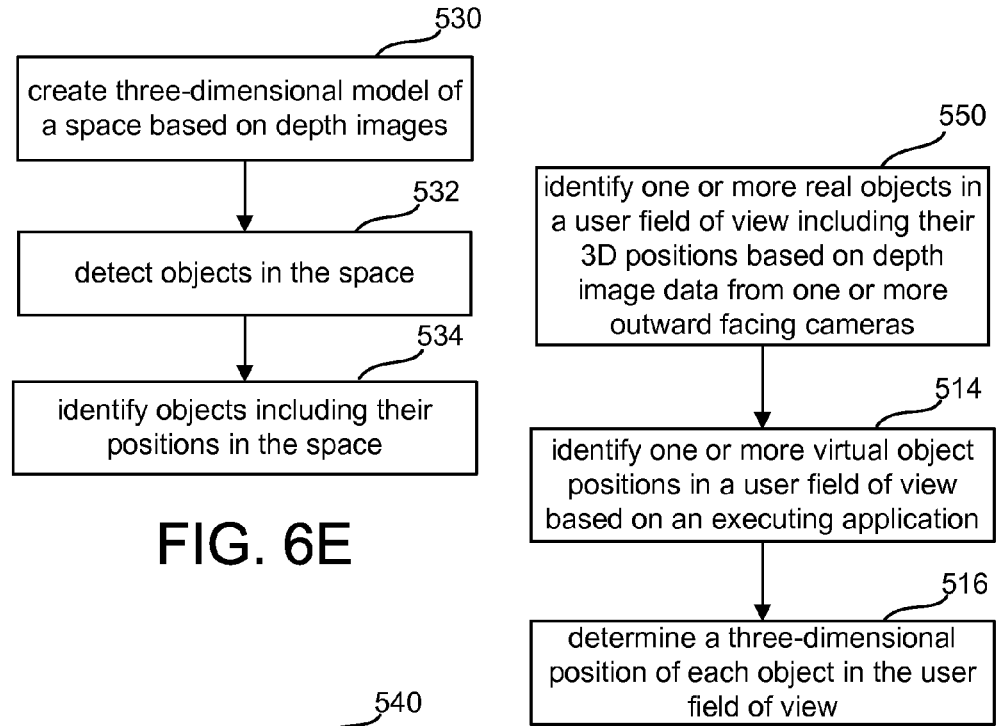
FIG. 6E
FIG. 6G
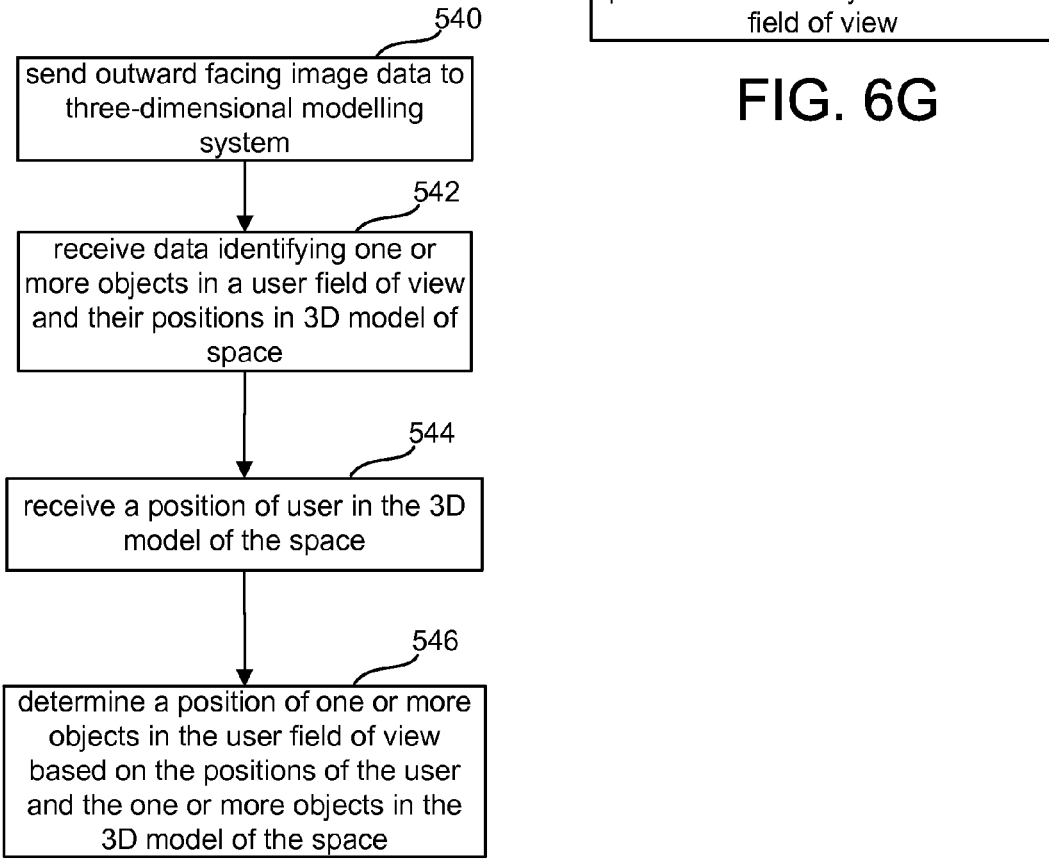
FIG. 6F

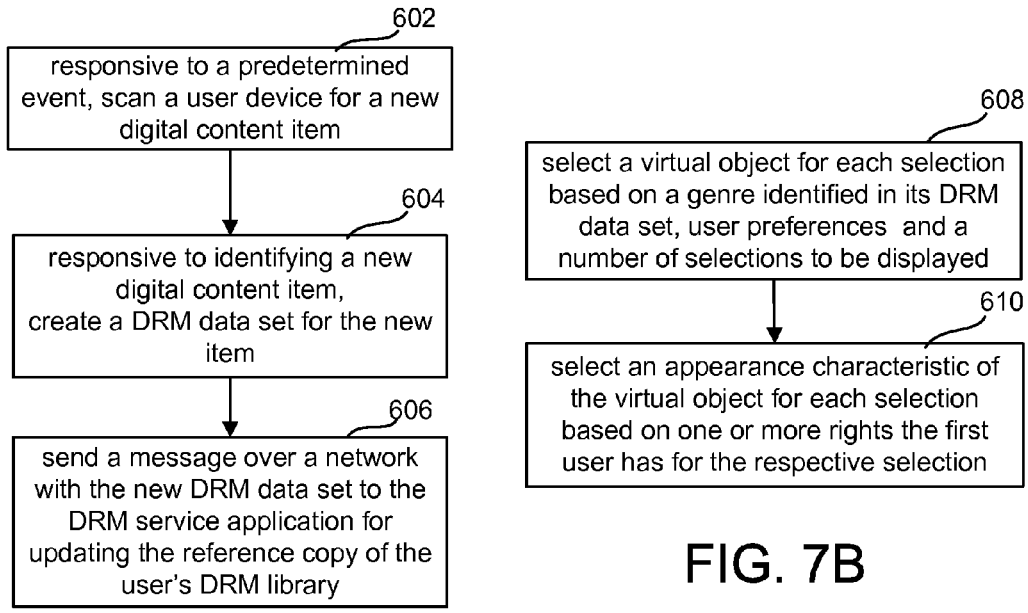
FIG. 7A
FIG. 7B
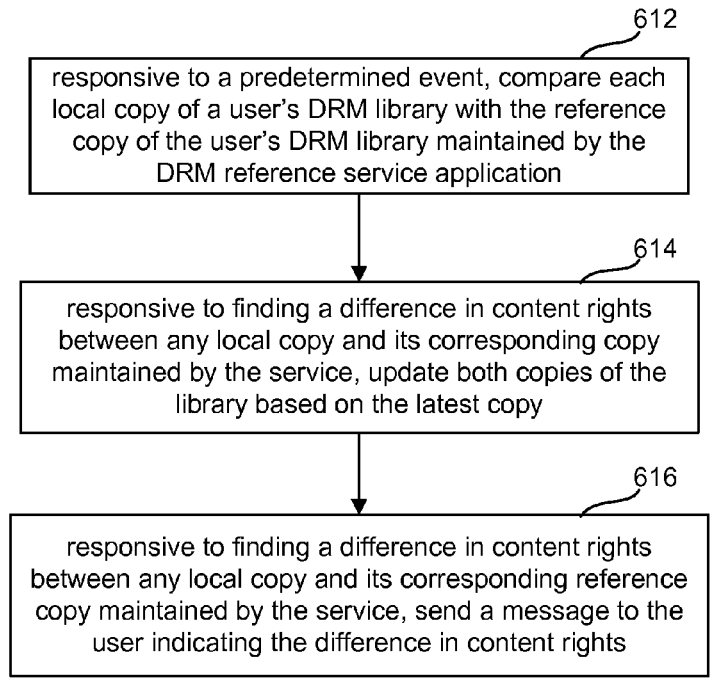
FIG. 7C

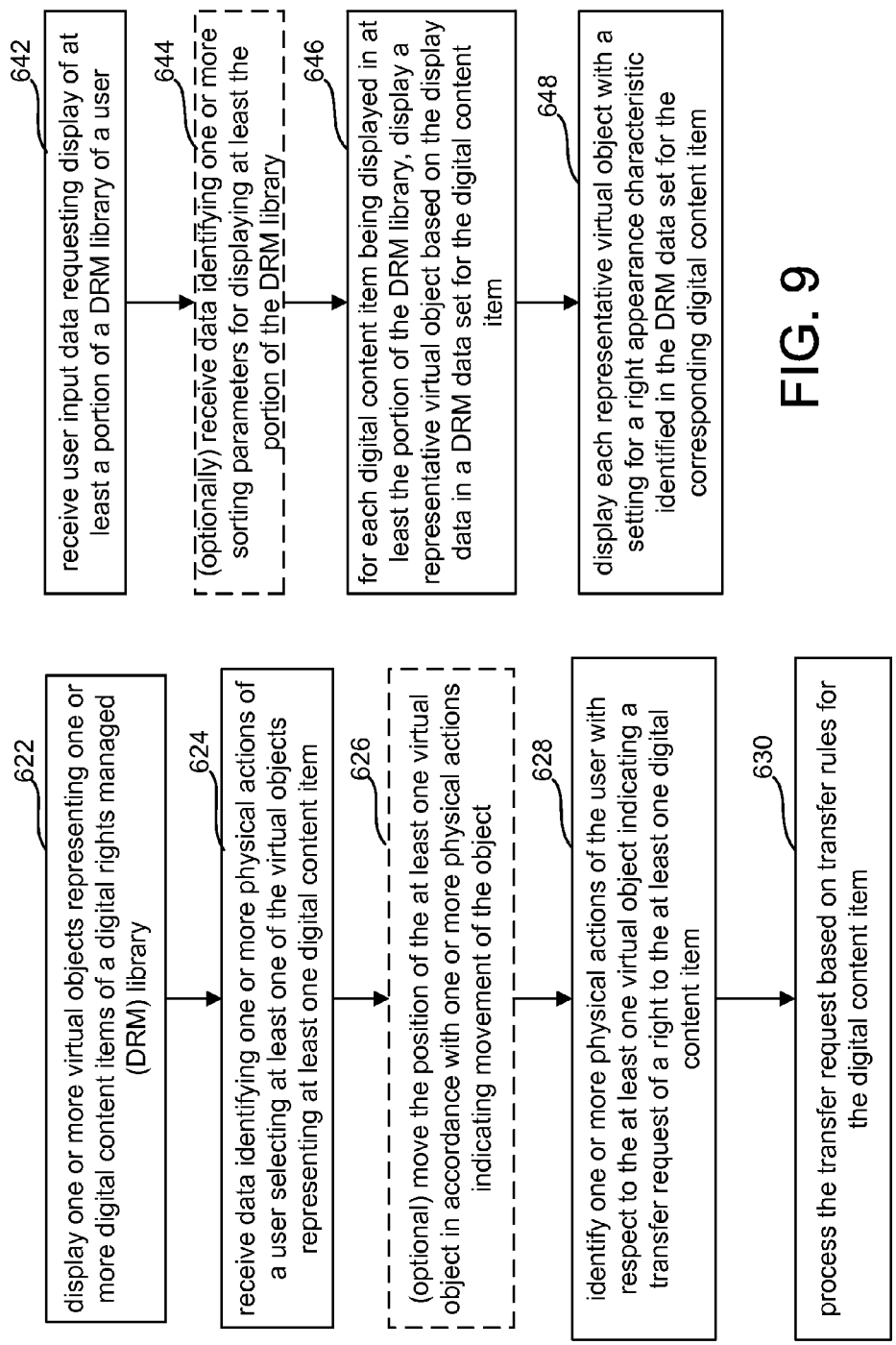

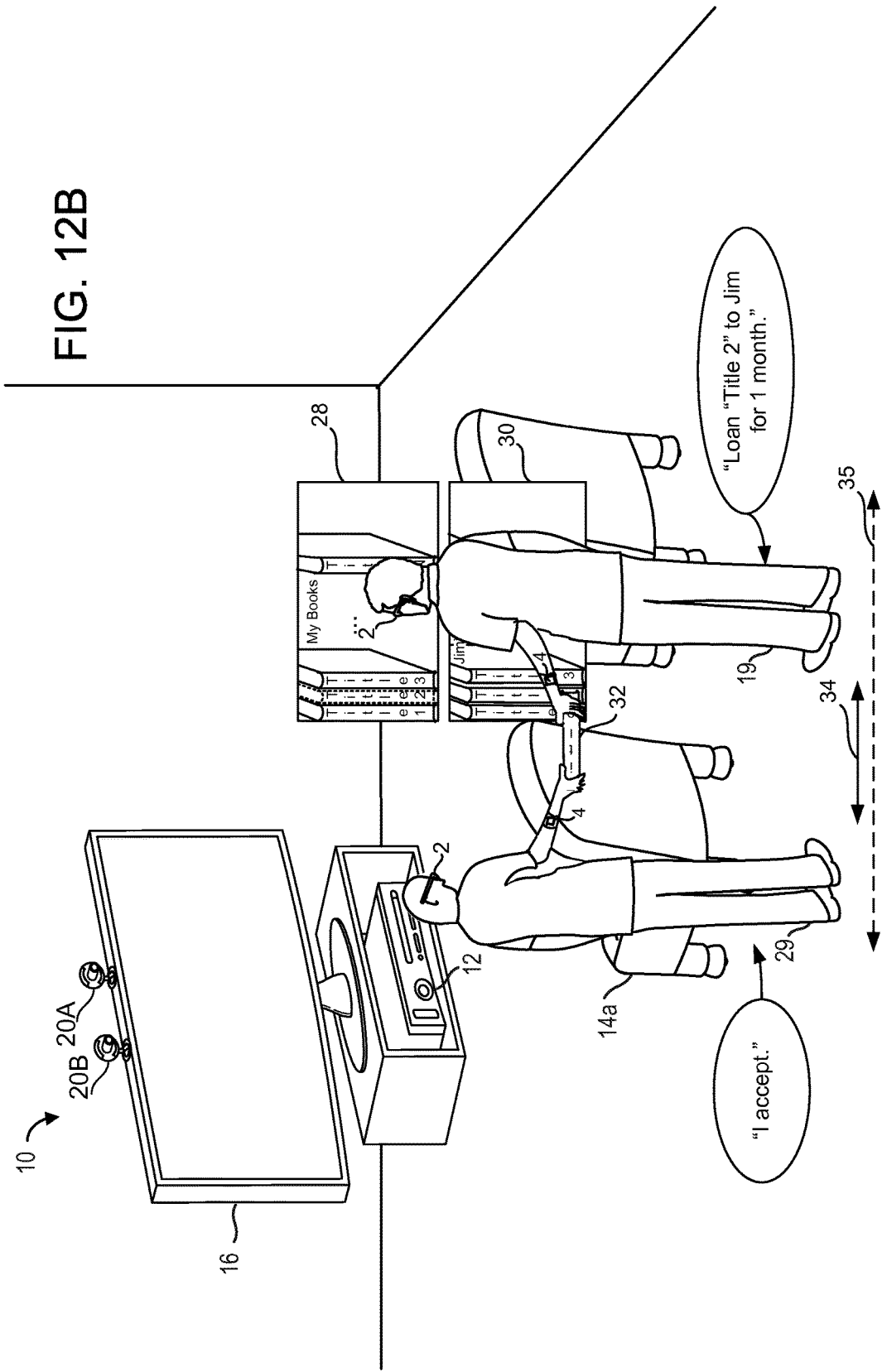

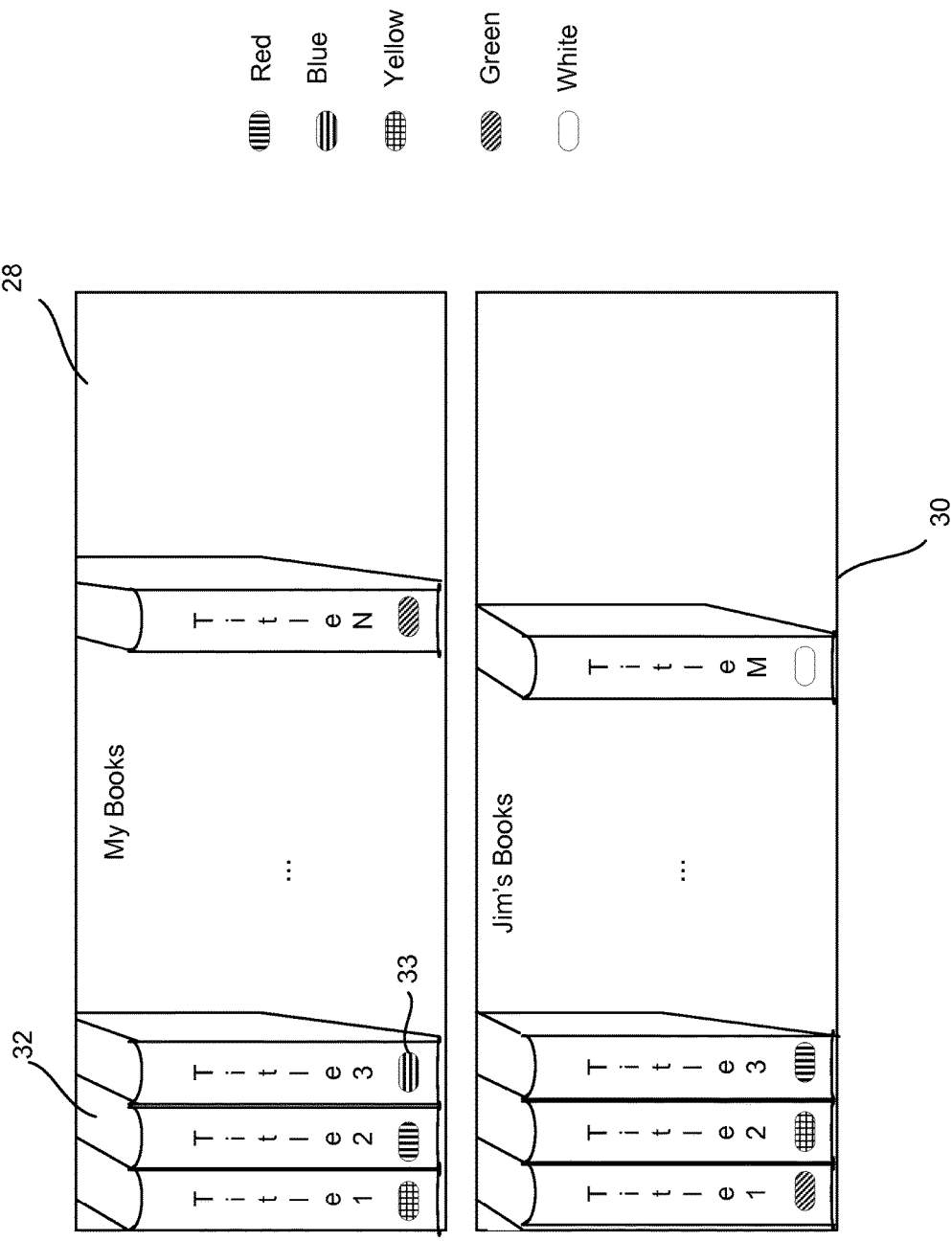

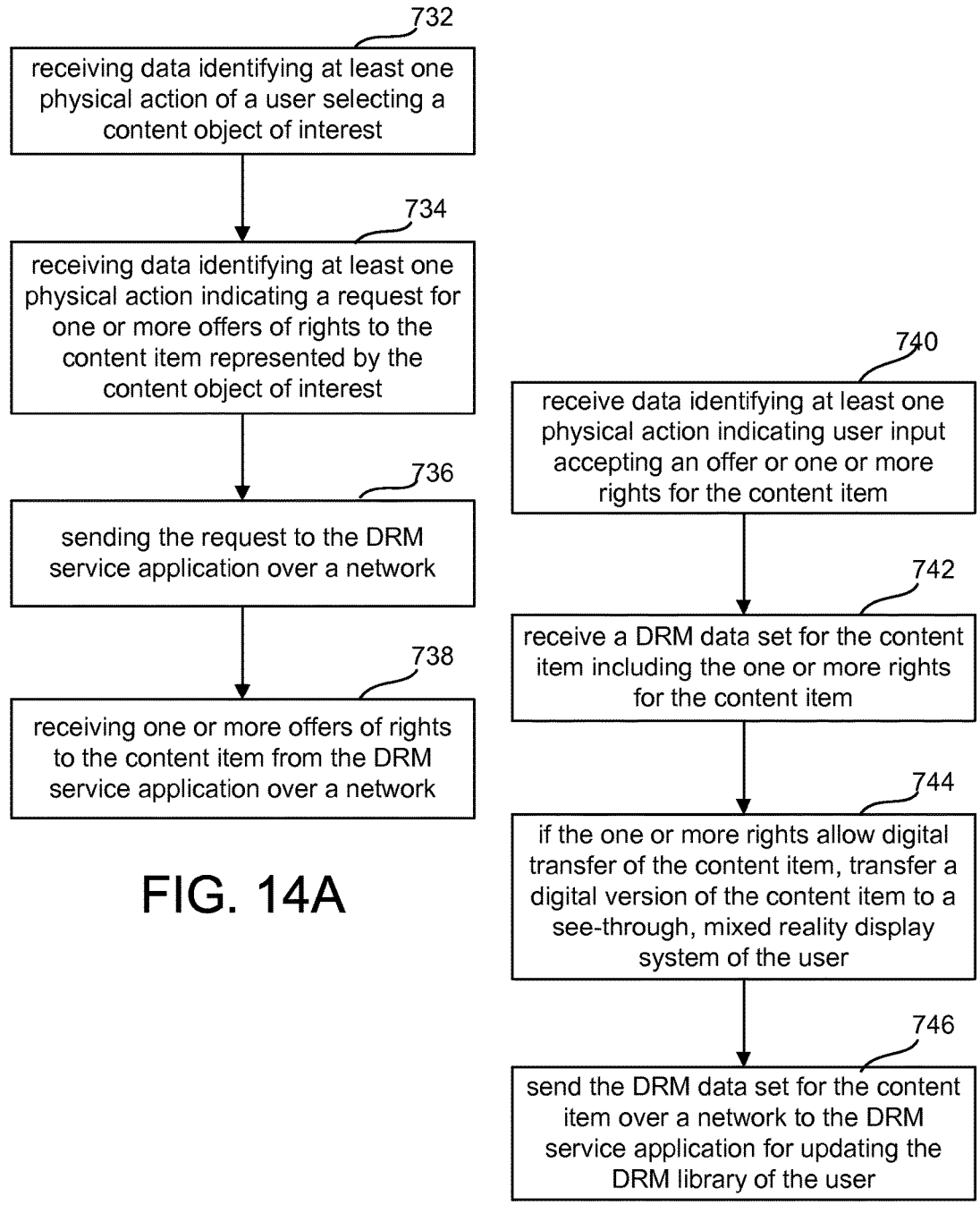

INTERACTION WITH VIRTUAL OBJECTS CAUSING CHANGE OF LEGAL STATUS

CLAIM OF PRIORITY

The present application is a continuation of U.S. Ser. No. 13/212,673 filed Aug. 18, 2011 where the latter parent application claims priority under 35 U.S.C. §119 (a) and (b) from Australian Patent Application No. 2011205223, entitled "PHYSICAL INTERACTION WITH VIRTUAL OBJECTS FOR DRM," by Hastings et al., filed Aug. 9, 2011 and where the disclosures of both said applications are incorporated herein by reference and in their entireties.

BACKGROUND

For content embodied in physical media (e.g. music albums on compact discs (CD), paper books, and movies on DVDs) friends and family can legally share or transfer the content by giving the physical medium of a CD, paper book or DVD to another person. However, due to the nature of content stored in a digital format, downloadable and playable on any general purpose computer system with a display or audio output, a license to the content rather than ownership of a copy of the content in a physical medium is typically what is granted to a purchaser or other legal recipient who downloads a digital copy of content today. The result has been the development of digital rights management to track content and prevent its unauthorized copying. Another result is the disruption of a powerful and desirable method of human interaction to readily share one's creative favorites of literature, music, film and the like with family and friends, at least in a legal way.

SUMMARY

An augmented or mixed reality display device allows virtual imagery to be mixed with a user's actual view of the real world. The technology described below provides embodiments of using a see-through, augmented reality or mixed reality display device system, which displays a virtual object representing a digital content item, for transferring a right for the digital content item. In many embodiments, the virtual object may be displayed to appear as a real world item of a physical medium, e.g. DVD, CD, book, associated with a genre, e.g. movie, song, novel, game, avatar accessory, of the digital content item. One or more users can perform physical actions with respect to the virtual object for indicating a transfer request of a right to the digital content item. Based on data identifying these physical actions, a determination is made as to whether the transfer request is permitted. The digital content item may be associated with a DRM library of a user which may also be displayed in some embodiments.

The technology provides an embodiment of a see-through, augmented reality display device system for transferring a right to a digital content item. The system comprises an image generation unit for displaying an image of a virtual object representing a digital content item in a user field of view of the display system of a first user. One or more software controlled processors receive data identifying one or more physical actions of the first user with respect to the virtual object indicating a transfer request of a right to the digital content item. The system further comprises a memory accessible by the one or more processors for storing software, and transfer rules for the digital content item upon which the one or more processors determine whether to transfer the right to the digital content item.

The technology provides an embodiment of a method for transferring a right to a digital content item represented as a virtual object by a see-through, augmented reality display system. The method comprises displaying one or more virtual objects representing one or more digital content items of a digital rights managed (DRM) library of digital content items of a first user. Data is received which identifies one or more physical actions of the first user selecting at least one of the virtual objects representing at least one digital content item. The method further comprises identifying one or more physical actions of the first user with respect to the at least one virtual object and a second user indicating a transfer request of a right to the at least one digital content item to the second user. The transfer request is processed based on transfer rules for the at least one digital content item.

The technology provides an embodiment of one or more processor readable storage media having stored thereon processor executable instructions for implementing a method for requesting an offer of a right to a content item by a user using a see-through, augmented reality display device system. The method comprising receiving data identifying at least one physical action of a user selecting a content object of interest based on data obtained by one or more sensors of the see-through, augmented reality display device system. Data is received identifying at least one physical action indicating a request for one or more offers of rights to the content item represented by the content object of interest based on data obtained by one or more sensors of the see-through, augmented reality display device system. A request is sent to a DRM service application over a network, and one or more offers of rights to the content item are received from the DRM service application over a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, mixed reality display device system.

FIG. 2A is a side view of an eyeglass temple of the frame of in an embodiment of the see-through, mixed reality display device embodied as eyeglasses providing support for hardware and software components.

FIG. 2B is a top view of an embodiment of a display optical system of a see-through, near-eye, mixed reality device.

FIG. 6E is a flowchart of a method embodiment for generating a three-dimensional model of a user space.

FIG. 6F is a flowchart of a method embodiment for identifying one or more objects in a user field of view.

FIG. 6G is a flowchart of a method embodiment for identifying one or more objects in a user field of view.

FIG. 7A is a flowchart of an embodiment of a method for adding a digital content item to a DRM library of content items for a user.

FIG. 7B is a flowchart of an embodiment of a method for generating display data for a virtual object representing a digital content item.

FIG. 7C is a flowchart of an embodiment of a method for updating copies of a DRM library of content items on different user devices.

FIG. 8 is a flowchart of an embodiment of a method for transferring a right to a digital content item using a see-through, augmented reality display device system.

FIG. 9 is a flowchart of an embodiment of a method for displaying one or more three-dimensional (3D) virtual objects representing one or more digital content items in a see-through, augmented reality display device system.

FIG. 12B illustrates an example of gestures and sounds as physical actions of users detected by a see-through, augmented reality display of each user for completing a transfer of a right to a digital content item between the users.

FIG. 12C illustrates an examples of settings for an appearance characteristic of one or more virtual objects to indicate a right associated with each virtual object.

FIG. 14A is a flowchart of an embodiment of a method for requesting an offer of a right to a content item, digital or embodied in a physical medium.

FIG. 14B is a flowchart of an embodiment of a method for accepting an offer of a right to a content item, digital or embodied in a physical medium.

DETAILED DESCRIPTION

Figure 1B:
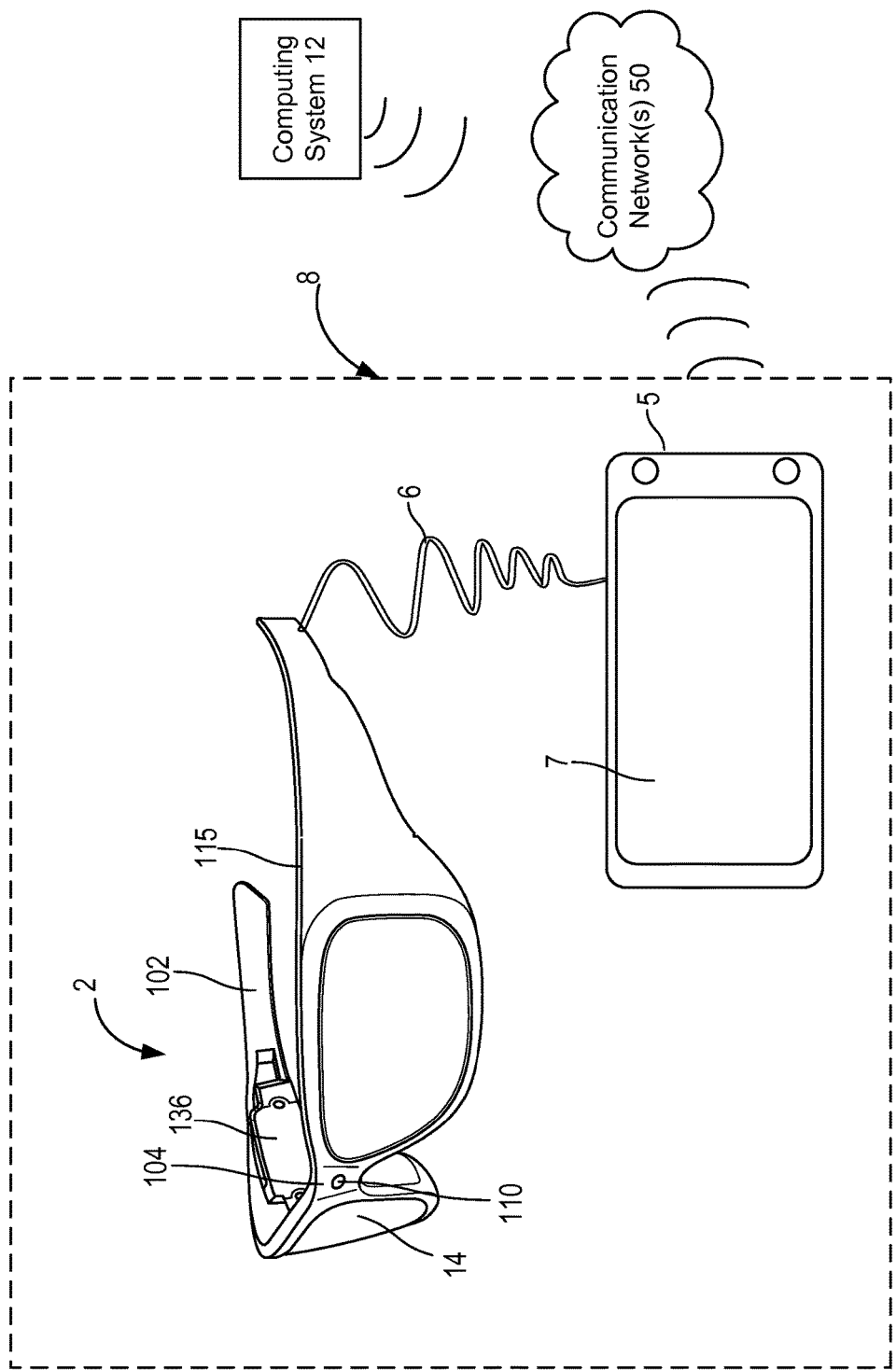
FIG. 1B is a block diagram depicting example components of another embodiment of a see-through, mixed reality display device system.

As mentioned above, the technology described below provides embodiments of using a see-through, augmented reality or mixed reality display device system, which displays a virtual object representing a digital content item, for transferring a right for the digital content item. In many embodiments, the digital content item is represented by a three-dimensional (3D) virtual object which the user can manipulate with a physical action. In some embodiments, the virtual object may be a two-dimensional representation of the digital content item. Sensors on the augmented reality display device system, and in some instances additional sensors present in the environment of the user, detect the user's physical action. For example, in a display of a movies portion of a user's DRM library as DVDs on a shelf, a user's hand may appear to contact one of the DVDs.

Sensors such as an outward facing camera on the see-through, augmented reality display device capture image data of this action. In some examples, the image data is sent to a remote computer system which analyzes the image data and identifies the movement of the hand as a pulling out of the DVD from the shelf. This action may be defined as a gesture or action which is a control or command to a DRM application resulting in the position of the virtual object being moved in accordance with the hand pulling movement detected for the user. An acceptance action of like "taking" or "accepting" the virtual object may also be detected. This helps bring human interaction of physically giving or handing an item to another person into the exchange with another person. In other examples, other types of physical actions may be used instead or in addition to hand movements. Some examples of other physical actions are sounds, for example spoken words indicating what right is being transferred, or a physical action of one's eye like fixating on a virtual object for an amount of time or blinking may be used to indicate an offer or acceptance of a right to a digital content item.

As described further below, the rights data for each digital content item is updated after a transfer, and a reference copy of a DRM library for each user stored remotely is updated to reflect the transfer.

FIG. 1A is a block diagram depicting example components of one embodiment of a see-through, augmented or mixed reality display device system. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application may be executing on hub computing system 12, or by one or more processors of the see-through mixed reality system 8.

In this embodiment, hub computing system 12 is communicatively coupled to one or more capture devices, such as capture devices 20A and 20B. In other embodiments, more or less than two capture devices can be used to capture the room or other physical environment of the user.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character. Each capture device, 20A and 20B, may also include a microphone (not shown). Hub computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or hub computing system 12 is connected to external speakers 22.

FIG. 1B is a block diagram depicting example components of another embodiment of a see-through, augmented or mixed reality display device system 8 which may communicate over a communication network 50 with other devices. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the hub computing system 12, gaming and non-gaming applications may execute on a processor of the mobile device 5 which user actions control or which user actions animate an avatar as may be displayed by the display optical systems 14. A display 7 of the mobile device 5 may also display data, for example menus, for executing applications. The mobile device 5 also provides a network interface for communicating with other computing devices like hub computing system 12 over the Internet 50 or via another communication network 50 (e.g. e.g., WiFi, Bluetooth, infra-red, cellular, 3G, 4G or other wireless communication means) via a wired or wireless communication medium using a wired or wireless communication protocol. A remote network accessible computer system like hub computing system 12 may be leveraged for processing power and remote data access by a processing unit 4 like mobile device 5. Examples of hardware and software components of a mobile device 5 such as may be embodied in a smartphone or tablet computing device are described in FIG. 20, and these components can embody the hardware and software components of a processing unit 4 such as those discussed in the embodiment of FIG. 3B. Some other examples of mobile devices 5 are a laptop or notebook computer and a netbook computer.

FIG. 2A is a side view of an eyeglass temple 102 of the frame 115 of in an embodiment of the see-through, mixed reality display device embodied as eyeglasses providing support for hardware and software components. At the front of frame 115 is physical environment facing video camera 113 that can capture video and still images which are transmitted to the processing unit 4,5. Particularly in some embodiments where the display device 2 is not operating in conjunction with depth cameras like capture devices 20a and 20b of the hub system 12, the physical environment facing camera 113 may be a depth camera as well as a visible light sensitive camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other examples of detectors that may be included on the head mounted display device 2 without limitation, are SONAR, LIDAR, Structured Light, and/or Time of Flight distance detectors positioned to detect information that a wearer of the device may be viewing.

The data from the camera may be sent to a processor 210 of the control circuitry 136, or the processing unit 4,5 or both, which may process them but which the unit 4,5 may also send to one or more computer systems 12 over a network 50 for processing. The processing identifies and maps the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIG. 3A. Inside, or mounted to temple 102, are ear phones 130, inertial sensors 132, GPS transceiver 144 and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside temple 102 is an image source or image generation unit 120. In one embodiment, the image source includes micro display assembly 120 for projecting images of one or more virtual objects and lens system 122 for directing images from micro display 120 into light guide optical element 112. Lens system 122 may include one or more lenses. In one embodiment, lens system 122 includes one or more collimating lenses. In the illustrated example, a reflecting element 124 of light guide optical element 112 receives the images directed by the lens system 122.

There are different image generation technologies that can be used to implement micro display 120. For example, micro display 120 can be implemented using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. The illumination is forward lit by either a white source or RGB source, depending on the technology. Digital light processing (DGP), liquid crystal on silicon (LCOS) and Mirasol® display technology from Qualcomm, inc. Are all examples of reflective technologies which are efficient as most energy is reflected away from the modulated structure and may be used in the system described herein. Additionally, micro display 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

FIG. 2B is a top view of an embodiment of a display optical system 14 of a see-through, near-eye, augmented or mixed reality device. A portion of the frame 115 of the near-eye display device 2 will surround a display optical system 14 for providing support for one or more lenses as illustrated and making electrical connections. In order to show the components of the display optical system 14, in this case 14r for the right eye system, in the head mounted display device 2, a portion of the frame 115 surrounding the display optical system is not depicted.

In one embodiment, the display optical system 14 includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below. In alternative embodiments, an opacity filter 114 may not be utilized.

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142 representing an optical axis of the display optical system 14r, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. In one example, 100% transmissivity represents a perfectly clear lens. An "alpha" scale can be defined from 0-100%, where 0% allows no light to pass and 100% allows all light to pass. The value of alpha can be set for each pixel by the opacity filter control unit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual object is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2B), which will include an eye tracking illumination device 134A and eye tracking camera 134B (see FIG. 3A). In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately. Alternatively, eye tracking camera may be an alternative form of tracking camera using any motion based image of the eye to detect position, with or without an illumination source.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See *Control your mobile music with eyeball-activated earphones*!, Feb. 19, 2010 [retrieved from the Internet Jul. 12, 2011: http://www.wirefresh.com/control-your-mobile-music-with-eyeball-actvated-headphones].) Eye blinks may be tracked as commands. Other embodiments for tracking eyes movements such as blinks which are based on pattern and motion recognition in image data from the small eye tracking camera 134 mounted on the inside of the glasses, can also be used.

In the embodiments above, the specific number of lenses shown are just examples. Other numbers and configurations of lenses operating on the same principles may be used. Additionally, FIGS. 2A and 2B only show half of the head mounted display device 2. A full head mounted display device would include another set of see through lenses 116 and 118, another opacity filter 114, another light guide optical element 112, another micro display 120, another lens system 122 physical environment facing camera 113 (also referred to as outward facing or front facing camera 113), eye tracking assembly 134, earphone 130, sensors 128 if present and temperature sensor 138. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3A:
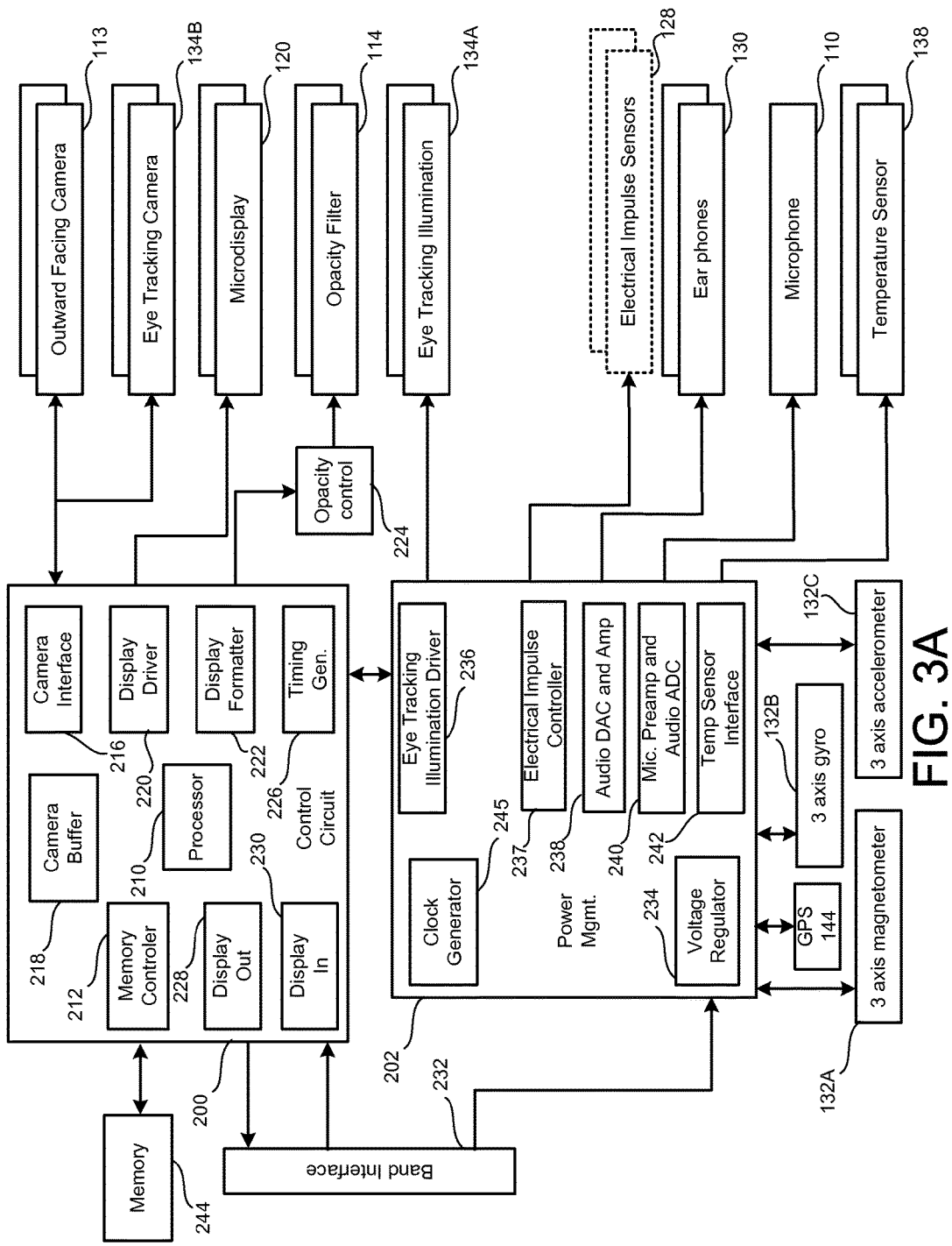
FIG. 3A is a block diagram of one embodiment of hardware and software components of a see-through, near-eye, mixed reality display device as may be used with one or more embodiments.
Figure 3B:
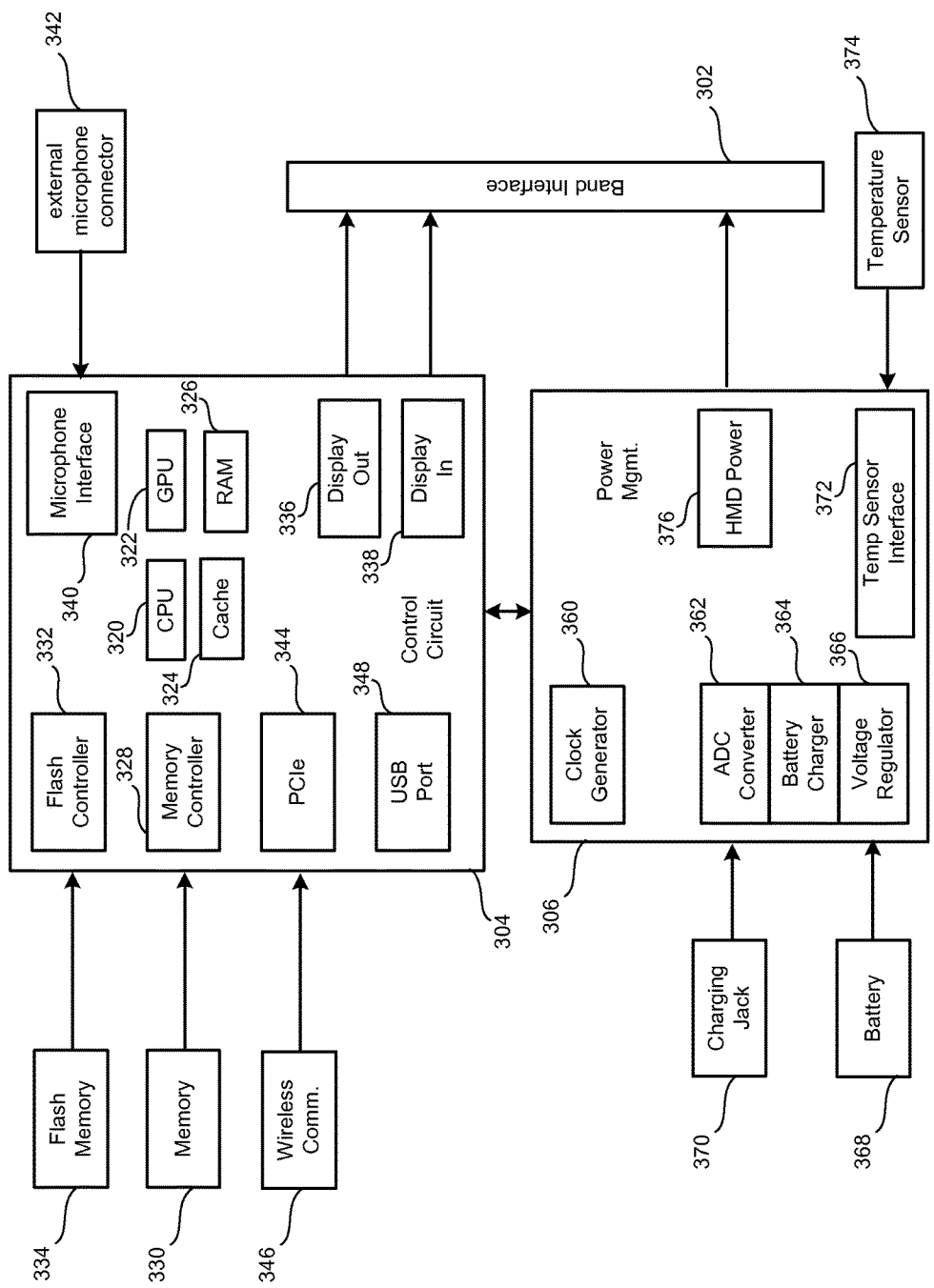
FIG. 3B is a block diagram describing the various components of a processing unit.
Figure 4:
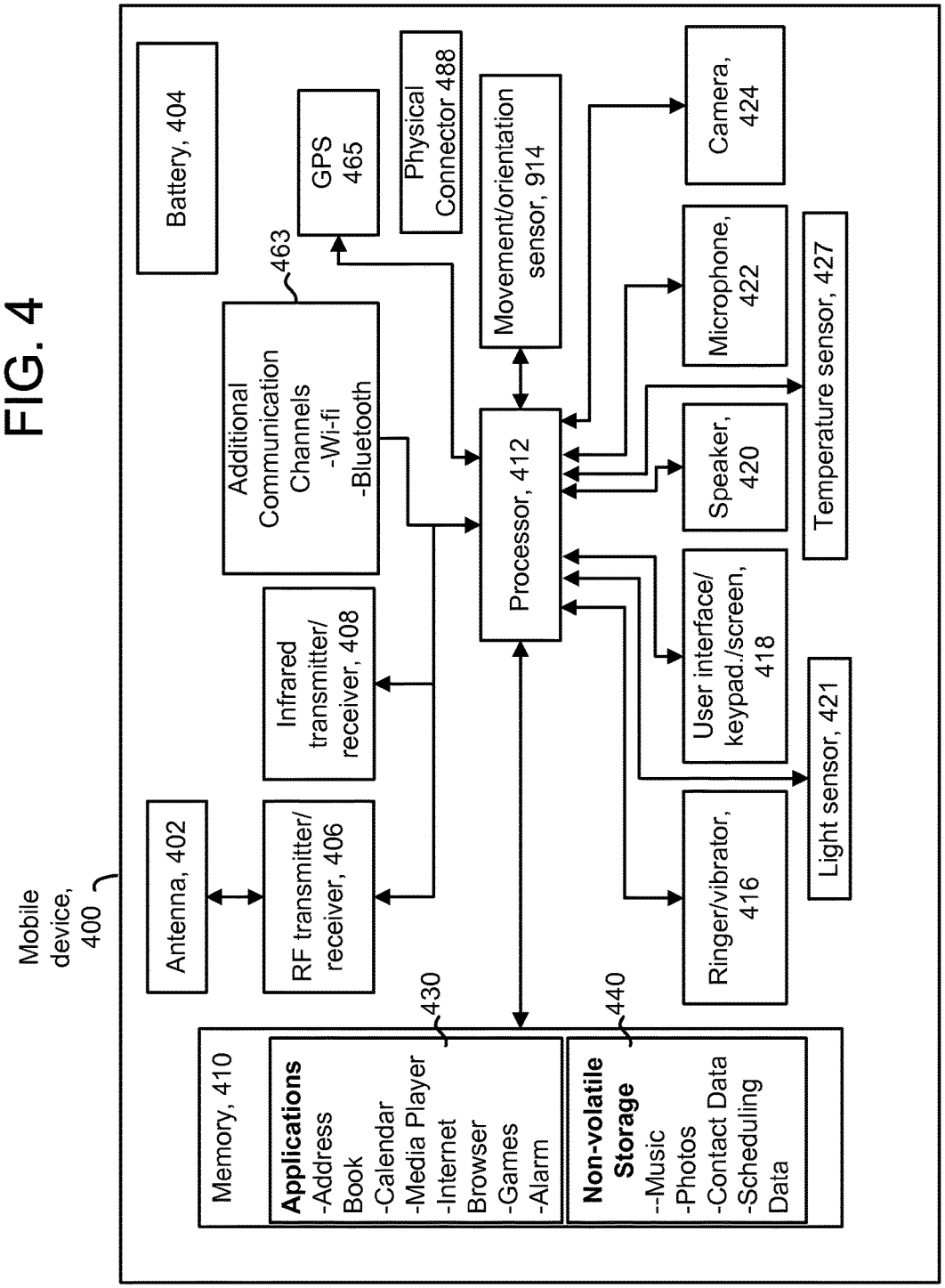
FIG. 4 is a block diagram of an exemplary mobile device which may operate in embodiments of the technology.

FIG. 3A is a block diagram of one embodiment of hardware and software components of a see-through, near-eye, mixed reality display device 2 as may be used with one or more embodiments. FIG. 3B is a block diagram describing the various components of a processing unit 4,5. In this embodiment, near-eye display device 2, receives instructions about a virtual image from processing unit 4,5 and provides data from sensors back to processing unit 4,5. Software and hardware components which may be embodied in a processing unit 4,5, for example as depicted in FIG. 4, receive the sensory data from the display device 2 and may also receive sensory information from a computing system 12 over a network 50 (See FIGS. 1A and 1B). Based on that information, processing unit 4, 5 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, sensors 128 if present, and temperature sensor 138 are shown in shadow to indicate that there are at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the augmented reality system. The display formatter 222 can identify to the opacity control unit 224 transmissivity settings for which pixels of the display optical system 14. Timing generator 226 is used to provide timing data for the system. Display out interface 228 includes a buffer for providing images from physical environment facing cameras 113 and the eye cameras 134 to the processing unit 4, 5. Display in interface 230 includes a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, audio DAC and amplifier 238, microphone preamplifier and audio ADC 240, temperature sensor interface 242, electrical impulse controller 237, and clock generator 245. Voltage regulator 234 receives power from processing unit 4,5 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Electrical impulse controller 237 receives data indicating eye movements from the sensor 128 if implemented by the display device 2. Power management unit 202 also provides power and receives data back from three axis magnetometer 132A, three axis gyro 132B and three axis accelerometer 132C. Power management unit 202 also provides power and receives data back from and sends data to GPS transceiver 144.

FIG. 3B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4G communication devices, Wireless USB (WUSB) etc. The wireless communication component 346 thus allows peer-to-peer data transfers with for example, another display device system 8, as well as connection to a larger network via a wireless router or cell tower. The USB port can be used to dock the processing unit 4, 5 to another display device system 8. Additionally, the processing unit 4,5 can dock to another computing system 12 in order to load data or software onto processing unit 4, 5, as well as charge processing unit 4, 5. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

As discussed above, the processing unit 4 may be embodied in a mobile device 5. FIG. 4 is a block diagram of an exemplary mobile device 400 which may operate in embodiments of the technology. Exemplary electronic circuitry of a typical mobile phone is depicted. The phone 400 includes one or more microprocessors 412, and memory 410 (e.g., non-volatile memory such as ROM and volatile memory such as RAM) which stores processor-readable code which is executed by one or more processors of the control processor 412 to implement the functionality described herein.

Mobile device 400 may include, for example, processors 412, memory 1010 including applications and non-volatile storage. The processor 412 can implement communications, as well as any number of applications, including the interaction applications discussed herein. Memory 410 can be any variety of memory storage media types, including non-volatile and volatile memory. A device operating system handles the different operations of the mobile device 400 and may contain user interfaces for operations, such as placing and receiving phone calls, text messaging, checking voicemail, and the like. The applications 430 can be any assortment of programs, such as a camera application for photos and/or videos, an address book, a calendar application, a media player, an internet browser, games, other multimedia applications, an alarm application, other third party applications like a DRM application and image processing software for processing image data to and from the display device 2 discussed herein, and the like. The non-volatile storage component 440 in memory 410 contains data such as web caches, music, photos, contact data, scheduling data, and other files.

The processor 412 also communicates with RF transmit/receive circuitry 406 which in turn is coupled to an antenna 402, with an infrared transmitted/receiver 408, with any additional communication channels 463 like Wi-Fi or Bluetooth, and with a movement/orientation sensor 414 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 412 further communicates with a ringer/vibrator 416, a user interface keypad/screen, biometric sensor system 418, a speaker 420, a microphone 422, a camera 424, a light sensor 421 and a temperature sensor 427.

The processor 412 controls transmission and reception of wireless signals. During a transmission mode, the processor 412 provides a voice signal from microphone 422, or other data signal, to the RF transmit/receive circuitry 406. The transmit/receive circuitry 406 transmits the signal to a remote station (e.g., a fixed station, operator, other cellular phones, etc.) for communication through the antenna 402. The ringer/vibrator 416 is used to signal an incoming call, text message, calendar reminder, alarm clock reminder, or other notification to the user. During a receiving mode, the transmit/receive circuitry 406 receives a voice or other data signal from a remote station through the antenna 402. A received voice signal is provided to the speaker 420 while other received data signals are also processed appropriately.

Additionally, a physical connector 488 can be used to connect the mobile device 400 to an external power source, such as an AC adapter or powered docking station. The physical connector 488 can also be used as a data connection to a computing device. The data connection allows for operations such as synchronizing mobile device data with the computing data on another device.

A GPS receiver 465 utilizing satellite-based radio navigation to relay the position of the user applications is enabled for such service.

The example hardware components for the display device, processing unit, mobile device example of a processing unit and computer system illustrated in the figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

What rights are available with respect to content depends on the location of the user and the people in the user's environment. For image processing purposes, both a person and a thing may be an object, and an object may be a real object, something physically present, or a virtual object in an image displayed by the display device 2. Typically, virtual objects are displayed in three dimensions so that just as a user interacts with real objects in three dimensions, the user may interact with virtual objects in three dimensions. In some embodiments, image data captured from one or more depth cameras provides data for determining the three dimensional relationship of the user to objects, real and virtual, in the user field of view.

Figure 5:
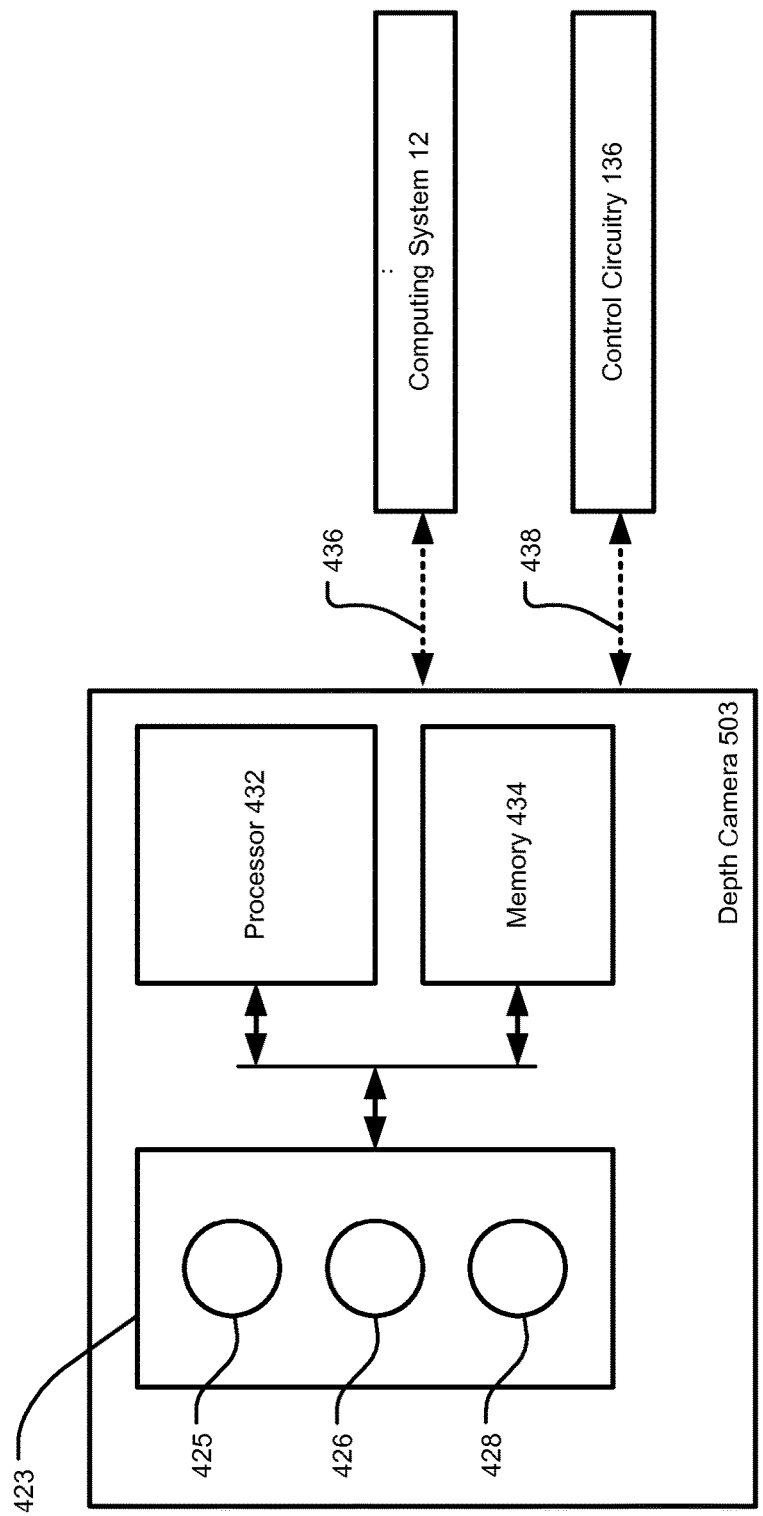
FIG. 5 illustrates an embodiment of a depth camera which may operate in a system embodiment of the technology.

FIG. 5 illustrates an embodiment of a depth camera 503. The outward, front or physical environment facing camera 113 may be embodied as a depth camera which sends images to the control circuitry 136 which in turn sends the images over a communication coupling 438 to the processing unit 4,5 for further processing locally or with the aid of a remote computer system 12. Additionally, as in FIG. 1A, capture devices 20A and 20B in the physical environment of the user may each or together embody a depth camera 503 for processing and sending depth data via a communication coupling 436 to a computer system 12 which may send data about object positions within a three-dimensional model of the environment over a network 50 to the processing unit 4,5. In some embodiments, a computing system 12 or the control circuitry 136 or the processing unit 4,5 may provide a clock to depth camera 503 that may be used to determine a rate of capture of image data, for example a frame rate of 30 frames a second.

According to an example embodiment, depth camera 503 may be configured to capture video with depth information including a depth image that may include depth values via any suitable technique including, for example, time-of-flight, structured light, stereo image, or the like. As shown in FIG. 5, depth camera 503 may include an image camera component 423 which may include an infra-red (IR) light component 425, a three-dimensional (3-D) camera 426, and an RGB (visual image) camera 428 that may be used to capture the depth image of a scene.

The depth image may include a two-dimensional (2-D) pixel area of the captured scene where each pixel in the 2-D pixel area may represent a depth value such as a distance in, for example, centimeters, millimeters, or the like of an object in the captured scene from the camera. According to one embodiment, the depth camera 503 may organize the depth information into "Z layers," or layers that may be perpendicular to a Z axis extending from the depth camera along its line of sight. In other embodiments, gestures for device commands may be determined from two-dimensional image data.

For example, in time-of-flight analysis, the IR light component 425 of the depth camera 503 may emit an infrared light onto the scene and may then use sensors (not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the depth camera 503 to a particular location on the targets or objects in the scene. In some embodiments, physical distance may be measured based on intensity of the reflected beam of light over time, for example, via shuttered light pulse imaging may be used. Additionally, in other example embodiments, the phase of the outgoing light wave may be compared to the phase of the incoming light wave to determine a phase shift which is then used to determine a physical distance from the capture device to a particular location on the targets or objects.

In another example embodiment, depth camera 503 may use a structured light to capture depth information. In such an analysis, patterned light (i.e., light displayed as a known pattern such as grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 426 and 428 so triangulation can be used to determined distance from cameras 426 and 428. In some implementations, the depth camera 503 will include a dedicated IR sensor to sense the IR light, or a sensor with an IR filter.

According to another embodiment, in depth image processing, two or more physically separated cameras 503 may view a scene from different angles to obtain visual stereo data that may be resolved to generate depth information. For example, there may be an outward facing camera 113 on each side of frame 115. Furthermore, depth cameras 503 in an environment, e.g. a place of business, may provide images as well as depth cameras 503 on HMD devices worn by users in the environment to a depth image processing application for creating and updating a three dimensional model of the objects within the environment. Other types of depth image sensors can also be used to create a depth image.

In an example embodiment, the depth camera 503 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transferring the data to a computing system, e.g. control circuitry 136 or hub computing system 12.

Depth camera 503 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 423.

As mentioned above, the depth camera 503 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. The communication link 438 may be implemented as a wire connection may connect a depth camera version of the outward facing camera 113 to the control circuitry 136 which forwards the image data to the processing unit 4,5 for further processing.

Software executing on one or more of the hardware components discussed above use the data provided by sensors such as the camera, orientation sensors and GPS sensor and network connections to track others with whom a user interacts and virtual objects representing digital content items which the user manipulates through physical actions. The physical actions act as controls or user input signifying when a transfer of a right to a digital content item occurs.

Figure 6A:
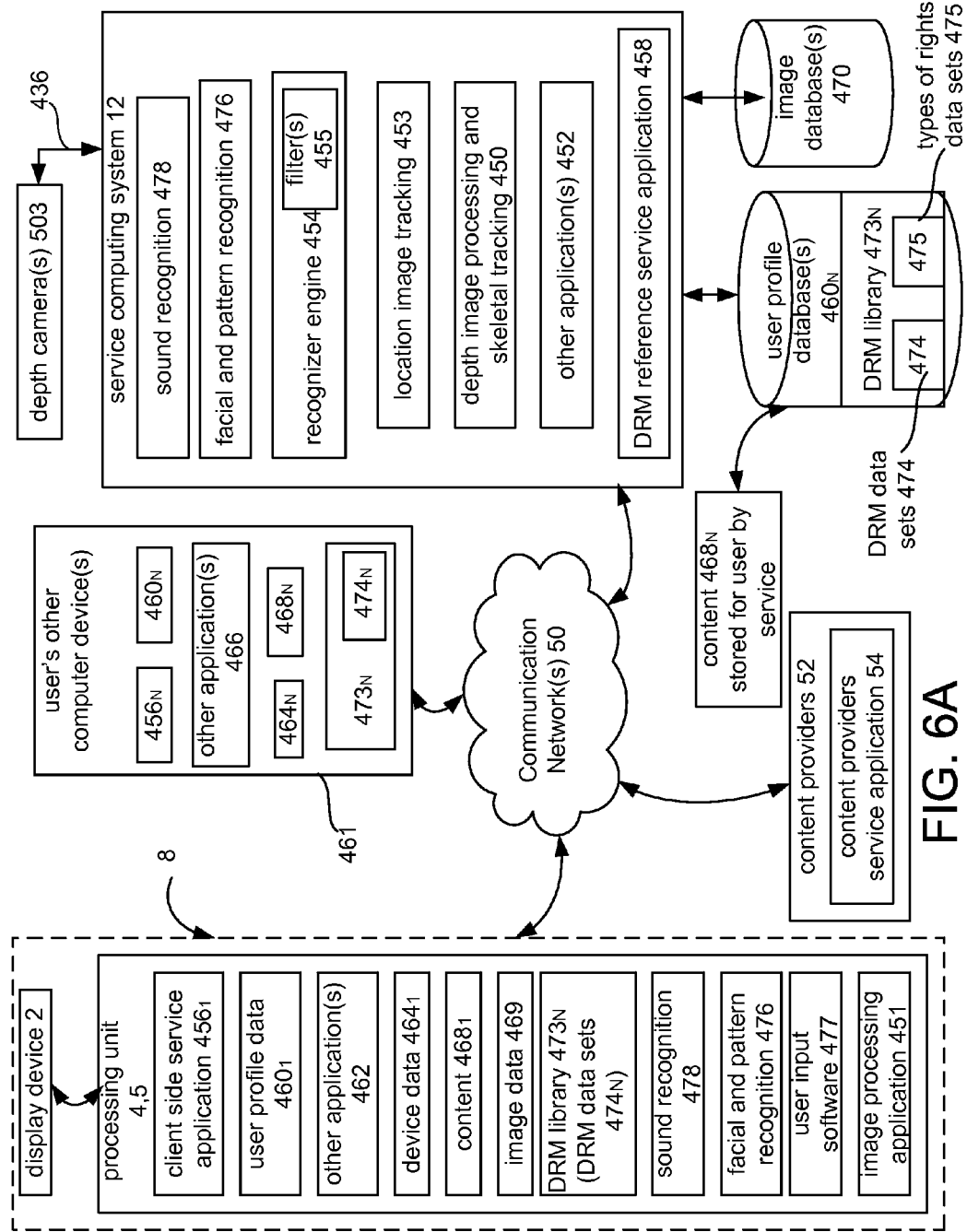
FIG. 6A is a block diagram of a system from a software perspective for transferring a right to a digital content item using a see-through, augmented reality display device system.

FIG. 6A is a block diagram of a system from a software perspective for transferring a right to a digital content item using a see-through, augmented reality display device system. In this embodiment, a see-through, augmented reality display system 8 executing a version of a digital rights management service application as a client side digital rights management (DRM) service application $456_1$ is communicatively coupled to a computing system 12 over a network executing another version of the digital rights management service application as a digital rights management (DRM) reference service application 458. Computing system 12 may be implemented using one or more computer systems.

Other processor based systems 461 of the user running local versions of the client side DRM service application 456N for their devices are also communicatively coupled over a network 50, e.g. the Internet, to the service computing system 12, the display device system 8 or both. A user may register one or more of his or her processor based systems or devices 461 with the service application 458 and grant permission for the DRM reference service application 458 as described further below to build and update a DRM library reference copy $473_N$ of the user's digital content items 468 stored on the user's various devices. The DRM service application 458 may also provide a storage service to users allowing them to store their digital content items $468_N$ in memories under the control of the owners of the DRM service, in other words, a cloud based content storage service. Some examples of other processor based systems 461 are other see-through, mixed reality display device systems, other head mounted display systems, servers, mobile devices like mobile phones, smartphones, netbooks, notebooks, and the like and desktop computers.

A user computing system 8, 461 may communicate for obtaining content with computer system 52 of content providers including producers of content, e.g. content right owners like movie producers and music publishers, and distributors of content like retailers or other distribution channels. A content provider DRM service application 54 also communicates with the DRM reference service application 458 to provide data on the rights available for each digital content item. The content provider application 54 may also provide digital rights transferred to users based on transactions. In this way, the DRM reference service application 458 maintains a database of data sets 475 of the types of rights available for each digital content item.

The DRM library $473_N$ creates a DRM data set 474 for each digital content item 468 to which a user has one or more rights. The data for the data set may come from metadata identifying rights of the user for content items stored on the user's computing systems 8, 461 or stored by the service as well as from DRM data supplied by content providers if the user has granted permission for content transactions to be tracked by the DRM service application 458. As indicated, each user computing system 8, 461 may include a local copy of the user's DRM library $473_N$ with DRM data sets $474_N$.

Figure 6B:
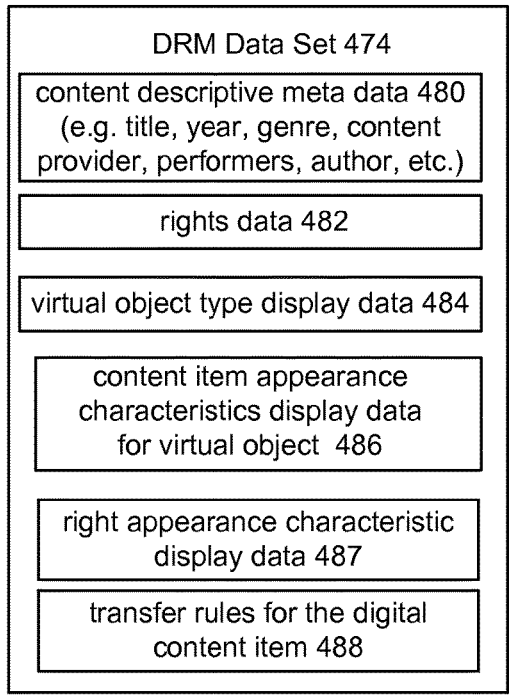
FIG. 6B illustrates an example embodiment of a DRM data set for a digital content item.

FIG. 6B illustrates an example embodiment of a DRM data set for a digital content item. In this example, the DRM data set 474 includes content descriptive meta data 480 which includes items such as the title, year, genre, content provider, performers or authors or both depending on the genre. Some examples of genre are movie, song, compilation of songs (e.g. an album), novel, play, collections of written works, TV show, documentary, game, game accessory, avatar character, avatar accessory, designs, images, live musical performance, live theatrical performance, educational program, exercise program and the like.

The data set 474 includes rights data 482 which includes one or more rights a user has with respect to the digital content item. Some examples of rights include traditional copyright rights like the right to make a copy, the right to listen to a song or play it on a device, the right to display the content for others to view, a lease to the digital content item and its expiration data, and even the right to give or sell your copy of a digital content item. Furthermore, other rights may be included such as the grant of a discount on a purchase of a digital content item, points or credits towards other content items, embodied in a physical medium or digital versions, for referring or granting a discount to another user. Examples of other rights may be the right to stream a digital content item from a source, or to stream so many copies to other users at the same time, and the right to give so many copies away. In another example, the rights data 482 may identify that the digital content item is a digital copy made of a content stored on a physical medium copy the user owns. The rights data tracks the chain of title back to a unique identifier for the physical medium, for example a UPC or Uniform Product Code of a CD or DVD. For a small fee, a user may be granted a right to a digital copy stored remotely in a network accessible memory. Additionally, the user may have the right to download and view or listen to a digital copy of the item in the latest digital technology or the digital technology of his or her choice.

As illustrated in some of the examples below, a user holds or points or otherwise manipulates a virtual object as if it were a real object which he or she is holding and passing to another, typical actions when giving a real thing to another person. To assist with this experience, a virtual object type may be assigned to each digital content item based on its genre by the DRM application. For example, virtual object type display data 484 may be a template for a DVD holder if the genre is movie or TV show or educational program. A virtual object type of book may be assigned for a novel or collection of short stories or poems, and a CD or even a record album may be the virtual object type assigned for music. Display data 486 (e.g. meta data in a markup language for a head mounted display) identifying appearance characteristics for the content item's virtual object may be used to incorporate not only the content descriptive material but also the cover art and back cover art and credits to make the virtual object look even more like a real CD, DVD, book, etc. Virtual object types other than those resembling physical media which embody content may also be used. For example, a menu of movie titles and other related information may be displayed against a theater markee background. Alternatively, a menu list of items can be displayed with the descriptive meta data 480. In such an example, images of the front and back covers showing the cover art, synopsis, and credits may be displayed as thumbnails which may be enlarged.

One or more appearance characteristics of the virtual object type may be selected for visually showing the user's rights or the broadest right a user has with respect to the content item represented by the virtual object. For example, different colors outlining the virtual object may indicate different rights, for example yellow indicates the right to stream to others, blue the right to make a number of copies, and red the right to sell or give away. The right appearance characteristic display data 487 indicates how to display a predetermined appearance characteristic for the virtual object type to reflect the user's rights as indicated in the rights data 482.

The transfer rules for the digital content item 488 identify the criteria by which content may be transferred via sharing, gift, copying or other forms of transfer. The source of these transfer rules are the content providers 52 via the DRM service application version 54 as well as the user by criteria entered via the client side service application 456. A user may want to give a copy to each of four (4) people identified as social networking friends, but his license to the item as noted in the rights data 482 only allows distribution of two copies. The license in the rights data 482 may grant the user the right to stream to an unlimited number of persons in his home, but he limits listening to the music of the digital content item to those over 18 due to some inappropriate lyrics. The transfer rules 488 for processing content in accordance with the rights data 482 may also provide a basis or criteria for determining a size of a predefined area or distance around a user in which sharing or other transfer of content is allowed. There may also be a trust level criteria between users for the transfers, and the size of the predefined area or distance may vary for recipient users depending on their trust levels.

Trust levels may be determined by user profile data 460 which identifies people known to the user as social networking friends which may be subdivided into different groups based on trust levels. Additionally, the user may explicitly identify trust levels in their user profile using the client DRM service application 456. In one embodiment, computing system 12 includes a user profile database $460_N$ which may aggregate data from user profile data stored on the different user computer systems 8, 461 of the user. The local copies of the user profile data may store some of the same user profile data 460. Some examples of user profile data are the user's expressed preferences, the user's friends' list, the user's preferred activities, a list of the user's reminders, the user's social groups, the user's current location, and other user created content, such as the user's photos, images and recorded videos. In one embodiment, the user-specific information may be obtained from one or more data sources such as the user's social networking sites, address book, email data, Instant Messaging data, user profiles or other sources on the Internet as well as data directly entered by the user.

In the example of FIG. 6A, each of the user's computer systems 8 and 461 comprises digital content items 468, user profile data 460, and other applications 462 and 466 as well as device data 464. Device data 464 may include a unique identifier for the computer system 8, 461, a network address, e.g. an IP address, model number, configuration parameters such as devices installed, the operation system, and what applications are available in the display system 8 and are executing in the display system 8 etc. Particularly for the see-through, mixed reality display system 8, the device data may also include data from sensors or determined from the sensors like the orientation sensors 132, the temperature sensor 138, the microphone 110, the electrical impulse sensor 128 if present, and the GPS transceiver 144. Image data 469 is also stored and may include images for analysis remotely by the computing system 12, and images to be displayed by the display optical systems 14 of the display device 2. As discussed further below, sound recognition software 478 may be used to interpret commands or identify nearby users. Facial recognition software 476 may also be used to determine users in image data. User input software 477 can receive data identifying physical actions like gestures, particular spoken commands or eye movements for controlling an application, for example a game or word processor. The controls may for example animate an avatar or on-screen character. In a DRM service application, the one or more physical actions may indicate a request for a transfer of rights, an offer and an acceptance of a right.

The block diagram of FIG. 6A also is a block diagram represents software components for recognizing physical actions in image data which is discussed further below. Furthermore, the image data plus sensor data available is processed for determining positions of objects, including other users, within a user field of view of the see-through, near-eye display device 2. This embodiment illustrates how the various devices may leverage networked computers to map a three-dimensional model of a user field of view and the real and virtual objects within the model. An image processing application 451 executing in a processing unit 4,5 communicatively coupled to a display device 2 can communicate image data 469 from front facing camera 113 over one or more communication networks 50 to a depth image processing and skeletal tracking application 50 in a computing system 12 for processing of image data to determine and track a user field of view in three dimensions. Either or both of the applications 451 and 450 working together may map a 3D model of space around the user. A depth image processing application 450 detects objects, identifies objects and their locations in the model. The application 450 may perform its processing based on depth image data from depth cameras 503 like 20A and 20B, two-dimensional or depth image data from one or more front facing cameras 113, and location metadata associated with objects in the image data obtained from a location image tracking application 453. Some examples of location metadata include GPS metadata, location data for network access points like a WiFi hotspot, and cell tower location information.

The location image tracking application 453 identifies images of the user's location in one or more image database(s) 470 based on location data received from the processing unit 4,5 or other location units (e.g. GPS units) identified as being within a vicinity of the user, or both. Additionally, the image database(s) may provide images of a location indexed or accessible with location metadata like GPS data, or WiFi hotspot or cell tower location information uploaded by users who wish to share their images. The location image tracking application provides distances between objects in an image based on location data to the depth image processing application 450. Additionally, the image processing application 451 may perform processing for mapping and locating objects in a 3D user space locally and may interact with the GPS image tracking application for receiving distances between objects. Many combinations of shared processing are possible between the applications by leveraging network connectivity.

Computing system 12 includes a depth image processing and skeletal tracking module 450, which uses the depth images to track one or more persons and things detectable by the depth camera 503. Depth image processing and skeletal tracking module 450 provides the tracking information to the client DRM application 456 and other applications 462, for example a video game, productivity application, communications application or other software application etc. The audio data and visual image data is provided to the depth image processing and skeletal tracking module 450 and may also provided to the DRM reference service application 458. Application 458 provides the tracking information, audio data and visual image data to recognizer engine 454. In another embodiment, recognizer engine 454 receives the tracking information directly from depth image processing and skeletal tracking module 450 and receives the audio data and visual image data directly from the processing unit 4,5 and the capture devices 502.

Recognizer engine 454 is associated with a collection of filters 455 each comprising information concerning a gesture, action or condition that may be performed by any person or object detectable by a depth camera 503. For example, the data from a depth camera 503 may be processed by filters 455 to identify when a user or group of users has performed one or more gestures or other actions. Those gestures may be associated with various controls, objects or conditions of application 456, 458. Thus, hub computing system 12 may use the recognizer engine 454, with the filters, to interpret and track movement of objects (including people).

Depth cameras 503 (e.g. capture devices 20A and 20B or front facing cameras 113) provide RGB images (or visual images in other formats or color spaces) and depth images to hub computing system 12. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 application), incorporated herein by reference in its entirety. The process of the '437 application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 455 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

A gesture such as a grip or taking hold of an object may be represented in image data representing movement of the fingers of a hand about a virtual object. A pass gesture for the DRM service application may comprise image data representing a grip or taking hold gesture for an object plus movement of the hand holding the object and another user's hand and fingers performing a grip or taking hold action in the image data.

In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality used to solve particular instances of gesture recognition.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Application 452 may use the filters 455 provided with the recognizer engine 454, or it may provide its own filter, which plugs in to recognizer engine 454. More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

In some instances, two-dimensional image data is only available. For example, the front facing cameras 113 only provide two-dimensional image data. From the device data 464, the type of front facing camera 113 can be identified, and the DRM service application 456 or 458 can plug in two-dimensional filters for its gestures.

References to front facing image data are referring to image data from one or more front facing cameras like camera 113 in FIGS. 2A and 2B. In these embodiments, the field of view of the front facing cameras 113 approximates the user field of view as the camera is located at a relatively small offset from the optical axis 142 of each display optical system 14, and the offset is taken into account in processing the image data.

Figure 6C:
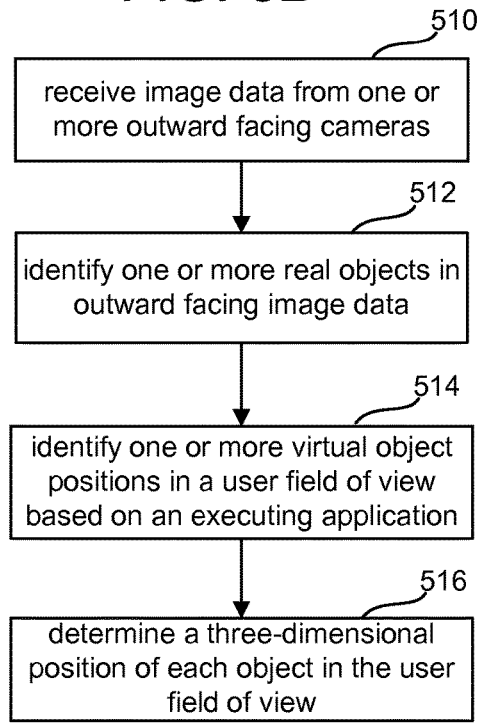
FIG. 6C is a flowchart of a method embodiment for determining a three-dimensional user field of view.

FIG. 6C is a flowchart of a method embodiment for determining a three-dimensional user field of view. In step 510, one or more processors of the control circuitry 136, the processing unit 4,5, the hub computing system 12 or a combination of these receive image data from one or more front facing cameras, and in step 512 identify one or more real objects in front facing image data. Data from the orientation sensor 132, e.g. the three axis accelerometer 132C and the three axis magnetometer 132A, can also be used with the front facing camera 113 image data for mapping what is around the user, the position of the user's face and head in order to determine which objects, real or virtual, he or she is likely focusing on at the time. Based on an executing application, the one or more processors in step 514 identify virtual object positions in a user field of view which may be determined to be the field of view captured in the front facing image data. In step 516, a three-dimensional position is determined for each object in the user field of view. In other words, where each object is located with respect to the display device 2, for example with respect to the optical axis 142 of each display optical system 14.

Figure 6D:
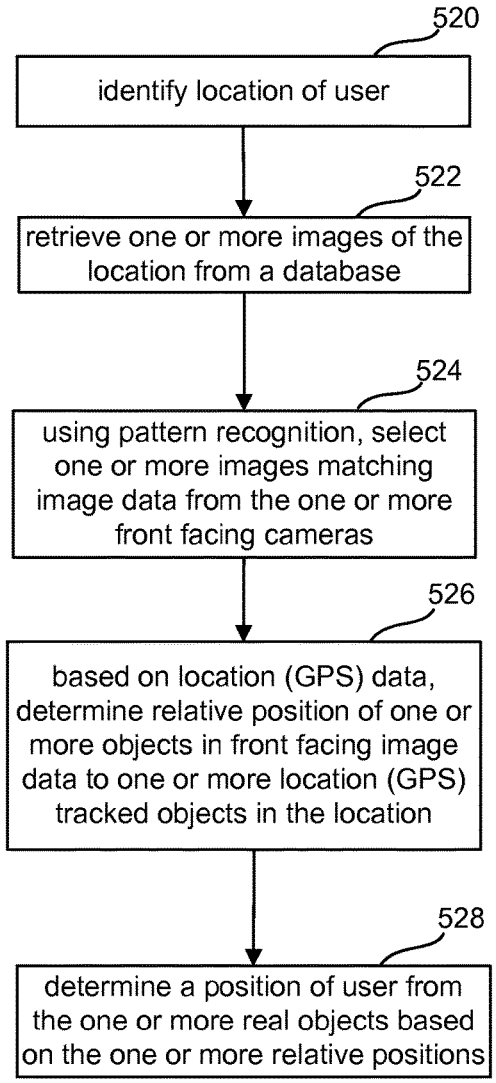
FIG. 6D is a flowchart of a method embodiment for identifying one or more real objects in a user field of view.

FIG. 6D is a flowchart of a method embodiment for identifying one or more real objects in a user field of view. This embodiment may be used to implement step 512. Each of the implementing examples in FIGS. 6D, 6E and 6F may be used separately or in conjunction with one another to identify the location of objects in the user field of view. In step 520, a location of user wearing the display device 2 is identified. For example, GPS data via a GPS unit 465 in the mobile device 5 or GPS transceiver 144 on the display device 2 may identify the location of the user. Additionally, an IP address of a WiFi hotspot or cellular station to which the display device system 8 has a connection can identify a location. Cameras at known positions within a location may identify the user through facial recognition. Additionally, identifier tokens may be exchanged between display device systems 8 via infra-red or Bluetooth. The range of the infra-red or Bluetooth signal can act as predefined distance for determining proximity of another user.

In step 522, one or more processors, retrieve one or more images of the location from a database (e.g. 470), and uses pattern recognition in step 524 to select one or more images matching image data from the one or more front facing cameras. In some embodiments, steps 522 and 524 may be performed remotely by a more powerful computer, e.g. hub 12, having access to image databases. Based on location data (e.g. GPS data), in step 526 the one or more processors determines a relative position of one or more objects in front facing image data to one or more GPS tracked objects 528 in the location, and determines in step 529a position of user from the one or more real objects based on the one or more relative positions.

In some embodiments such as in FIG. 1A, a user wearing a see-through, near-eye, mixed reality display may be in a location in which a computer system or one or more computers provides a three-dimensional mapping of objects within a space, e.g. a store. FIG. 6E is a flowchart of a method embodiment for generating a three-dimensional model of a user space. In step 530, a computer system with access to depth cameras like hub system 12 with capture devices 20A and 20B creates a three-dimensional model of a space based on depth images. The depth images may be from multiple perspectives and may be combined based on a common coordinate space, e.g. the store space, and creates a volumetric or three dimensional description of the space. In step 532, objects are detected in the space. For example, edge detection may be performed on the depth images to distinguish objects, including people, from each other. In step 534, the computer system 12 identifies one or more detected objects including their positions in the space. The objects may also be identified based on comparisons of shape and pattern recognition techniques including facial recognition techniques with reference images of things and people from image databases. As illustrated in FIG. 6A, the computing system 12 may also include facial and pattern recognition software 476.

FIG. 6F is a flowchart of a method embodiment for identifying one or more objects in a user field of view based on depth data transmitted to the see-through, mixed reality display device 2. The processing unit 4,5 in step 540 sends front facing image data to a three-dimensional modeling system such as may be implemented by the depth image processing application 450 executing on a computer system like hub computing system 12 communicatively coupled to depth cameras 20A and 20B. Data from the orientation sensor 132 may also be sent for identifying face or head position. For example, when a user enters a store, a computer system at the store provides a 3D mapping of the store and what and who is in it. In step 542, the display device 2 receives data identifying one or more objects in a field of view for the user and their positions in a 3D model of a space. The image data from the one or more front facing cameras 113 approximates the user field of view, so the hub system 12 identifies the object in the front facing image data, for example through image recognition or pattern recognition software. Orientation data may also be used with the front facing image data to refine the user field of view and identify objects tracked by the computer system 12 falling within the user field of view. (The hub system 12 also aligns the front facing image data when received from two or more cameras 113 for identifying the user field of view.) The processing unit 4,5 in step 544 receives a position of the user in the 3D model of the space, and in step 546 the processing unit 4,5, or the processor 210 of the control circuitry 136 or both determines a position of one or more objects in the user field of view based on the positions of the user and the one or more objects in the 3D model of the space. In another example, the processing unit 4,5 receives the position of the user and the one or more objects as determined by the computer system 12.

FIG. 6G is a flowchart of a method embodiment for identifying one or more objects in a user field of view when the front facing camera 113 is a depth camera providing depth image data or has a depth sensor for providing depth data which can be combined with image data to provide depth image data. In step 550, the one or more processors of the display device 2, e.g. processor 210 of the control circuitry or the processing unit 4,5, or both identifies one or more real objects in a user field of view including their three-dimensional positions based on depth image data from one or more front facing cameras. The one or more processors may also map the user field of view based on orientation data from an orientation sensor 132 in addition to the image data. The one or more processors perform step 514 of identifying virtual object positions in the user field of view based on an executing application and step 516 of determining a three-dimensional position of each object in the user field of view. Additionally, a remote computer system 12 may also providing additional processing power to the other processors for performing the steps of FIG. 6G.

Each of the method embodiments of FIGS. 6C through 6G are typically performed repeatedly as the user and objects within the user's environment move around.

For illustrative purposes, the method embodiments below are described in the context of the system embodiments described above. However, the method embodiments are not limited to operating in the system embodiments described above and may be implemented in other system embodiments.

FIG. 7A is a flowchart of an embodiment of a method for adding a digital content item to a DRM library of content items for a user. A user may register an account with the DRM service application granting permission for the service to automatically track the user's content on one or more of his or her processor based systems 461 or as added to storage 468 by the service. The DRM library provides a convenient way to view a user's content items stored on his or her different processor based systems or devices 461 which have been gathered over time, typically from different content providers 52. In step 602, responsive to a predetermined event, the client side DRM service application 456 scans a user device 8, 461 for a new digital content item 468. An example of a predetermined event is a scheduled time or a message from a content provider application 54 indicating a content transfer or right transfer has occurred. In step 604, responsive to identifying a new digital content item, the client side DRM service application 456 creates a DRM data set for the new item. In another embodiment, the client side application 456 may send a message to the DRM reference service application 458 with content descriptive data 480 and rights data 482 derived from a transfer or transaction, and the DRM reference service application 458 creates the DRM data set for the new item. In step 606, the client side application 456 sends a message over a network with the new DRM data set to the DRM reference service application 458 for updating the reference copy of the DRM library of the user maintained by the DRM reference service application.

FIG. 7B is a flowchart of an embodiment of a method for generating display data for a virtual object representing a digital content item. In step 608, a virtual object is selected for each selection based on a genre identified for the content item and user preferences. For example, the genre may be movies, and the user prefers each movie presented as a theater marquee with its title and main stars. Another user may prefer a DVD virtual object which includes the front and back covers of the physical DVD copy for each movie. Additionally, in step 610, an appearance characteristic of the virtual object is selected for each selection based on one or more rights the user has for the respective selection. For example, as mentioned above a yellow highlight of the outline of the DVD copy or book copy may indicate a streaming right to the content item and blue may indicate a certain number of copies which may be distributed while red indicates the rights to sell and give the user's copy of the digital content item away.

FIG. 7C is a flowchart of an embodiment of a method for updating copies of a DRM library of content items on different user devices. The method embodiment may be performed by either the client side application 456 or the DRM reference service application 458 or a combination of the two. Each client side application 456 downloads the reference copy of the library or the DRM reference service application 458 may upload each local copy of the library. In step 612, responsive to a predetermined event, (e.g. scheduled time or time period) each local copy of a DRM library is compared with the user's reference copy of his or her DRM library. In step 614 responsive to finding a difference in content rights between any local copy and its corresponding copy maintained by the service, both copies are updated based on the latest copy. In addition, there may be valid data indicators, for example a digital signature or encryption based data, which also may be checked to verify an updated DRM data set in the library resulted from a valid transfer. In step 616, responsive to finding a difference in content rights between any local copy and its corresponding copy maintained by the service, the version of the DRM service application 456, 458 performing the updating method sends a message to the user indicating the identified difference in content rights in case there is an error.

FIG. 8 is a flowchart of an embodiment of a method for transferring a right to a digital content item using a see-through, augmented reality display device system. In step 622, the image processing software 451 causes the microdisplay 120 to display one or more virtual objects, which in many examples are three-dimensional objects, but may also be two-dimensional objects or a combination, as directed by the client side DRM service application 456$_1$, representing one or more digital content items of a digital rights managed (DRM) library. For example, the image processing software 451 may interpret the display data 484 into commands for the microdisplay 120. In step 624, the one or more processors of display device system 8 receive data identifying one or more physical actions of a user selecting at least one of the virtual objects representing at least one digital content item. In the case of physical actions indicating movement of the virtual object by the user, an optional step 626 may be performed in which the image processing software 626 moves the position of the at least one virtual object in accordance with one or more physical actions. An example of such a physical action is a gesture like a pull gesture of the virtual object including a grip gesture (see FIG. 12A) and pulling the user's hand gripping the virtual object towards the user. The pass gesture is another example of such a physical action. In other examples, eye movements or vocal instructions may be physical actions indicating movement of the virtual object. In step 628, one or more physical actions of the user are identified with respect to the at least one virtual object indicating a transfer request of a right to the at least one digital content item. In step 630, the transfer request is processed based on transfer rules 488 for the digital content item.

In many examples, the one or more physical actions of the user which are identified with respect to the at least one virtual object are also with respect to the at least one virtual object and another user for indicating a transfer request of a right to the at least one digital content item. The transfer request of the right may be for transferring the right from the user, the grantor who currently has the right, to the other user, the intended recipient, but in some instances, the transfer request is a request to transfer a right to the user making the request.

An illustrative example of when the transfer request is for receiving rights may occur in a situation like the following. The user, who has rights to transfer to a digital content item, is not using at least his display device 2, but may grant permission via a client application 456N executing on his processing unit embodied as a mobile device 5 or executing on one of his other computer systems 461$_N$ for another user with a display device system 8 to view his DRM library. The DRM reference service application 458 receives the grant of permission and sends the DRM library of the user to the other user. This other user may request a transfer of rights, e.g. a request to view a digital content item, for himself or herself. In such examples, the user requesting the right may perform one or more physical actions with respect to a virtual object, e.g. manipulations like grabbing and holding the virtual object and saying predefined words such as "May I view?", "May I stream?", "May I borrow?", or "May I have?". These physical actions captured in data by the requesting user's display device system 8 and processed by the image processing software 451 or with the aid of remotely executing depth image processing and skeletal tracking software 450 and recognizer engine 454 and sound recognition software 478 cause a transfer request for a right to the digital content item to the requesting user to be sent as a message to a computer system 461$_N$, e.g. a mobile device 5, to the user who currently has the right. The request may be granted by responding to the message with another message. In some examples, the request may be granted with a physical action performed in a capture area, e.g. audio capture area of the microphone 110 or a visual capture area of the front facing cameras 113, of the display device system 8 of the requesting user. A user may perform a physical action even though he or she is not wearing his or her display device 2.

FIG. 9 is a flowchart of an embodiment of a method for displaying one or more three-dimensional (3D) virtual objects representing one or more digital content items in a see-through, augmented reality display device system. In step 902, user input software 477 receives user input data requesting display of at least a portion of a DRM library of a user. In step 904, the user input software 477 optionally receives data identifying one or more sorting parameters for displaying at least the portion of the DRM library. Some examples of sorting parameters may be spoken words like "just movies" or an actor's name or a genre, a year, an author and other parameters. Such parameters are typically identified in content descriptive meta data 480. In step 906, for each digital content item being displayed in at least the portion of the DRM library, a representative virtual object is displayed based on the display data in a DRM data set for the digital content item, and in step 908, each representative virtual object is displayed with a setting for a right appearance characteristic identified in the DRM data set for the corresponding digital content item.

Figure 10:
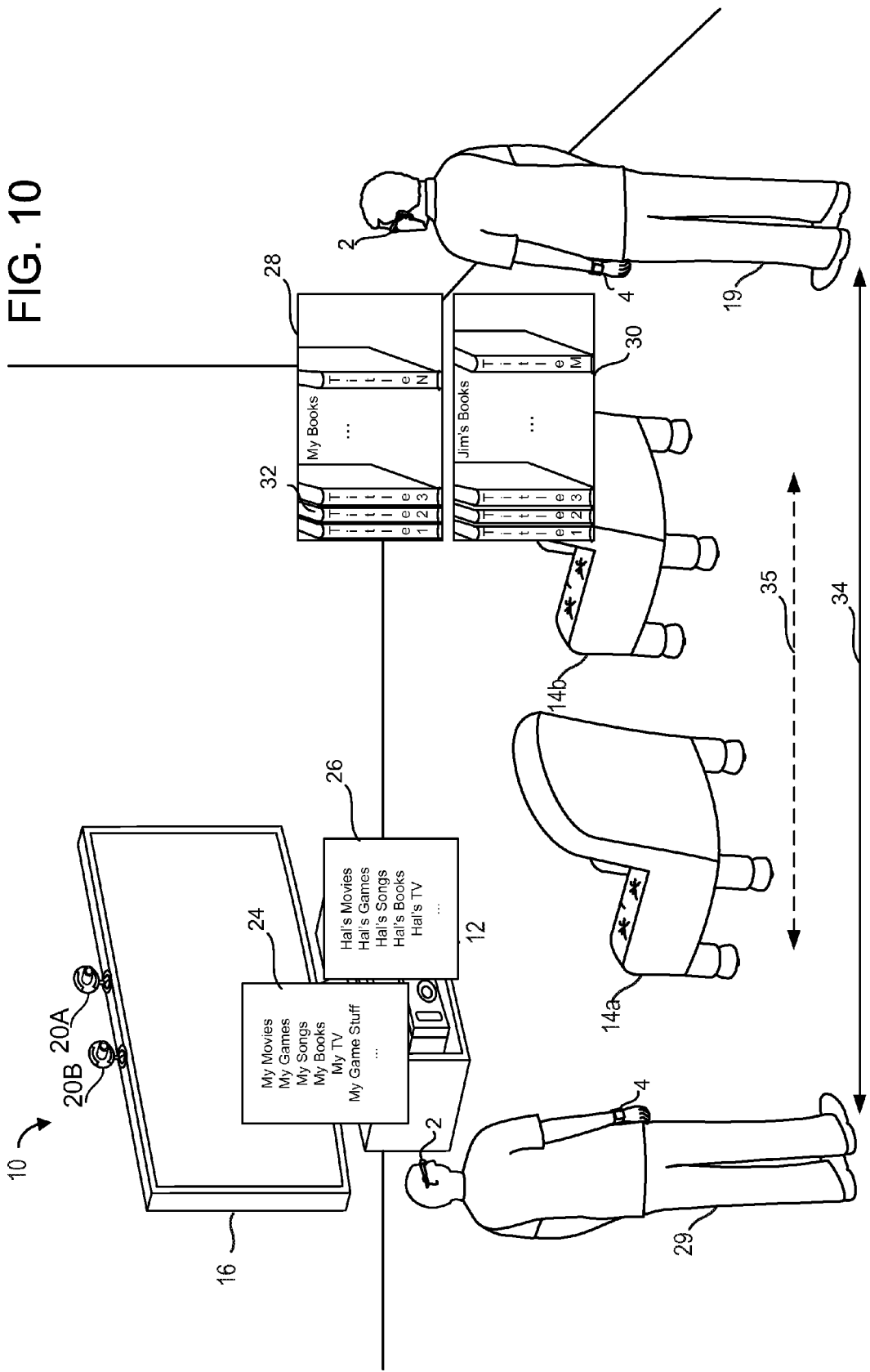
FIG. 10 illustrates some example displays of one or more DRM libraries seen through a see-through, augmented reality display device.
Figure 11A:
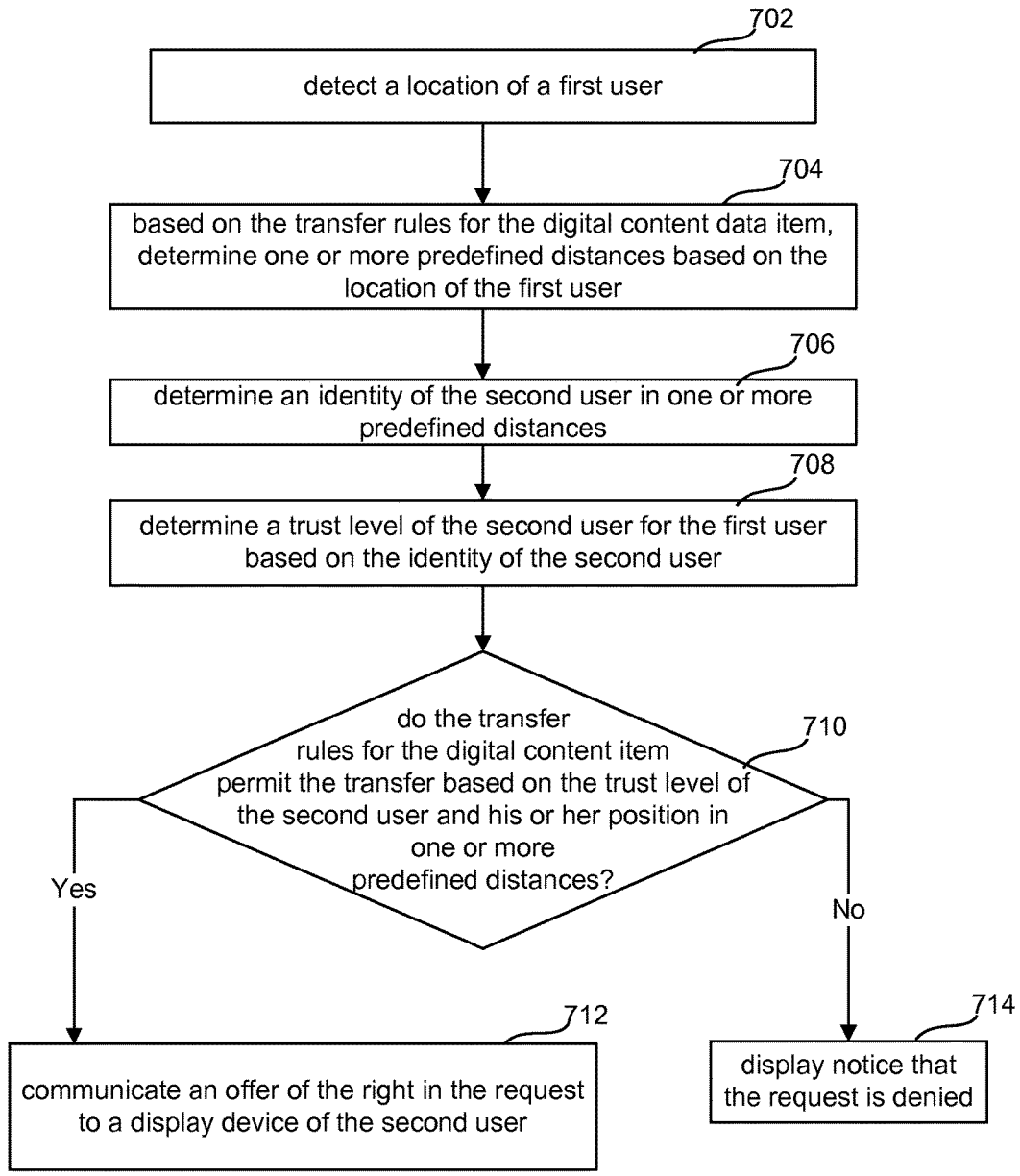
FIG. 11A is a flowchart of an embodiment of a method for determining whether an offer of a right to a digital content item is permitted in accordance with transfer rules for the digital content item.
Figure 11B:
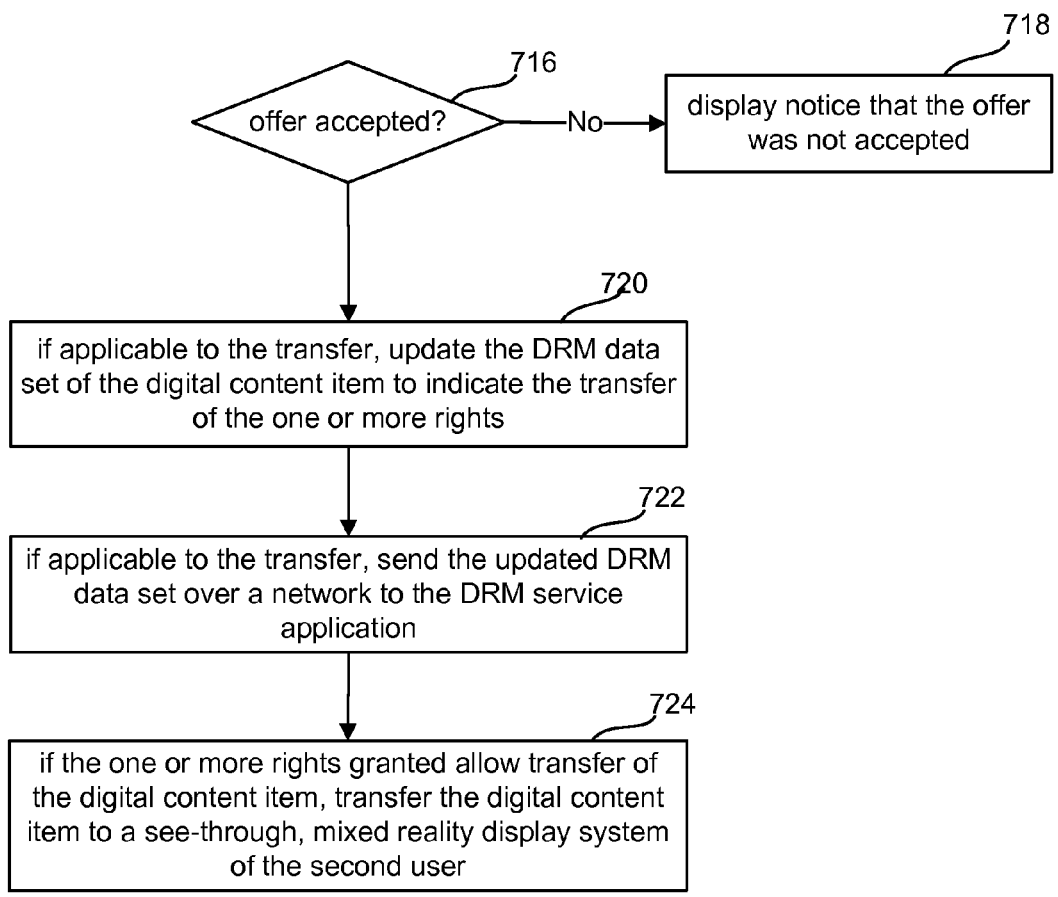
FIG. 11B is a flowchart of an embodiment of a method for updating a DRM library after acceptance of a permitted offer of the digital content item.

FIG. 10 illustrates some example displays of one or more DRM libraries seen through a see-through, augmented reality display device. In this example, two users, referred to as Hal 19 and Jim 29, are viewing display data from each of their own DRM libraries and that of the other. A DRM library may be treated as a digital content item and have its own DRM data set 474. A user can allow access to his or her DRM library according to transfer rules as with another digital content item. For example, a user can set transfer rules for where and with whom his DRM library may be viewed. FIGS. 11A and 11B provide details of how to process a transfer request for a right to content and the content.

In the example, Hal 19 and Jim 29 are in Hal's living room as indicated by the system 10 and chairs 14a and 14b. Each user is wearing a see-through, augmented reality display device system 8, in this example the display device 2 as a pair of eyeglasses and a processing unit 4 on a wrist. The displays 24 and 26 and 28 and 30 are illustrated to show what each of Hal and Jim is currently viewing through his respective glasses 2. A person who walks in the living room without glasses or without permission to view the libraries will not see these display views. Jim 29 sees through his display device an introductory menu 24 listing genres in his DRM library, and another introductory menu 26 listing genres in Hal's DRM library. Jim may prefer menus for viewing his library or the library may be for identifying which portion of the library is to be displayed as three dimensional objects. Hal 19 sees through the display optical systems 14 in his display device 2, what appear as book shelves 28 and 30 including a plurality of virtual objects 32 representing written works like novels, non-fiction, collections of short stories, poems, essays and the like as a book in his library portion of "My Books" and similarly written works in Jim's library portion denoted as "Jim's Books" appear as books.

Additionally, Jim and Hal are at a range or distance 34 from each other. As discussed below, a predefined distance between users may be a criteria of the transfer rules for transferring a right to a digital content item. In this example and in FIGS. 12A and 12B, an example of a predefined distance or range is shown by dashed line 35 for a transfer of an item. In other words if using wireless transceivers for detecting being within a predefined distance based on detected wireless signals, the distance between Jim and Hal's wireless transceivers, e.g. wireless communication components 346, are to be within the predefined distance 35. A predefined distance may be different for different activities. For example, being able to view another user's DRM library or manipulate a virtual object of that library may each have a different predefined distance, e.g. a farther distance permitted, than a predefined distance for a transfer of rights. Transfers of different rights may also have different predefined distances.

FIG. 11A is a flowchart of an embodiment of a method for determining whether an offer of a right to a digital content item is permitted in accordance with transfer rules for the digital content item. In step 702, the client side DRM service application 456 detects a location of a first user. For example, device data 464 may identify the location based on the IP address of a wireless hot spot which is associated with a known location in user profile data 460 such as the user's home. In other examples, the location data may be GPS data, e.g. indicating the workplace of the first user. Image data of the location may be matched against image databases 470 by the remote location image tracking 453 in another example.

Based on the transfer rules for the digital content data item, in step 704 one or more predefined distances are determined based on the location of the first user. For example, the location of the first user, let's say Hal 19, is his home, and Hal is connected via a secured connection to his home based wireless access point. Connections to Hal's wireless access point, e.g. router, are only available within 50 feet of the WAP. Hal's user profile data indicates the IP address of the network router is his home, and GPS data from transceiver 144 confirms he is at home. The transfer rules may identify his home as a predefined area in which streaming content from his DRM library is permitted under the conditions that the other user or users also have a secure connection to Hal's wireless access point. This also means that the other user and Hal are within 50 feet of his wireless access point. If Hal is having a party, streaming a playlist of songs to his attendees may be implemented based on these transfer rules. However, if the user is in an area like an airport with an unsecured wireless access point, unlimited streaming may not be allowed by the transfer rules 488 set by the content provider application 54 in the transaction for the content item. Because the location is the airport, the transfer rules have additional criteria to be satisfied. For example as discussed further below, a second user participating in the transfer request must be within a closer distance to the user than being near the same wireless access point, and the second user must have a minimum trust level with respect to the first user. Of course, the rights data 482 controls too. If a user only has purchased the right to stream up to three copies at a time, even if at home, no more than three people can view the streamed content at the same time.

As illustrated in FIG. 10, a predefined distance, range or area may also be determined from the see-through, augmented reality display device system. Another predefined area, range or distance may also be set-up using infra-red, WUSB and Bluetooth connections which are available within a few feet, e.g. less than 3, 5 or 10 feet depending on the implementation. As part of the client side DRM service application 456, identity tokens may be exchanged between see-through, augmented reality devices which identify users logged in to the DRM service application. In this way, a user can identify other users within a predefined area in a peer-to-peer configuration. This may be useful in situations, like an airplane or in areas without network connectivity, e.g. campsite, where users still wish to share or transfer content.

A predefined distance range or area around the user may also be defined based on the nature of the physical actions used for the transfer and the scale of the front facing camera 113. For example, the physical actions for indicating an offer and indicating an acceptance of a right to a digital content item may be handing a virtual object representing the object from the grantor user to the recipient user. Typical arm span for humans may be a basis for defining an area or distance. In another example, a criteria to look at the other user for a transfer may use the scale of objects in images, even two-dimensional images, based on the camera settings, e.g. focal length, resolution, etc. for determining a distance between the first and second user and whether the position of the second user falls within a predetermined distance of the first user.

In step 706, an identity of the second user is determined. In one example, if connected to a communication network 50 executing the DRM reference service application 458, the reference application 458 can determine or received location data for other subscriber users using their see-through, augmented reality display device systems 8 and determine the identities of those who are within one or more predefined distances of the users based on the location data and send a version of this information to the client side DRM service application 456 which identifies those known to the user via his or her user profile data, for example, based on contacts and social networking friend groups. Unknown users may be identified as unknown but their presence noted. In the peer-to-peer example, the client side DRM service application 456 can match identities against user profile data as well.

As per step 708, a trust level of the second user for the first user is determined based on the identity of the second user from user profile data of the first user. As mentioned above, based on location, there may be different predefined distances and different trust levels for users within those predefined distances for different types of rights requesting to be transferred. In step 710, the client side DRM service application 456 determines whether the transfer rules for the digital content item do permit the transfer based on the trust level of the second user and his or her position in the one or more predefined distances. If the rules permit, the transfer, the client application 456 communicates an offer of the right in the request in step 712 to a display device system 8 of the second user. If the transfer is not permitted, the client side application 456 in step 714 displays a notice to the first user, the grantor, that the request is denied.

In other embodiments, the second user may not have a see-through, augmented reality display device system 8. However, the display device system 8 of the user granting the right may communicate with another computer system of the second user, the intended recipient of the right. An example of such a system is a mobile device. Based on device data (e.g. like that of device data 464), the operating system of the grantor's or transferor's display device system 8 identifies the type of device and IP address of the device of the second user. In the example of the mobile device, responsive to the display device system 8 processing the physical actions of its user to transfer a right to the second user, e.g. the pass gesture, the processing unit 4,5 of the display device system 8 of the grantor may communicate the offer of the right in the request as a text message or e-mail message over a cellular network or over a network accessed via a wireless access point to the mobile device of the second user. Similarly, in examples where the second device is a computer system like a laptop or a desktop computer, a message indicating the offer terms may be transferred over a computer network. The offer may be accepted by responding to the message with a like message or with a physical action performed in a capture area, e.g. audio capture area of the microphone 110 or a visual capture area of the front facing cameras 113, of the display device system 8 of the first user.

FIG. 11B is a flowchart of an embodiment of a method for updating a DRM library after acceptance of a permitted offer of the digital content item. In step 716, the client side DRM application 456 determines whether the offer was accepted or not based on one or more physical actions detected of the second user. In some instances, the see-through, augmented reality display device system 8 of the first user captures data from sensors of the physical action of the second user. In other instances, the see-through, augmented reality display device system 8 of the second user captures data from its sensors of the physical action of the second user, and sending a message of acceptance to the display device system 8 of the first user, e.g. via a network 50 or a peer-to-peer connection. (See examples below in FIG. 14B and FIGS. 15A and 15B).

Responsive to data indicating the offer was not accepted, the client application 456 causes a notice to be displayed that the offer was not accepted in step 718. An example of such data is a message indicating a time interval in which the second user was to make the physical action signifying acceptance has passed. Responsive to data indicating the offer was accepted (e.g. received data indicating a physical action indicating acceptance by the second user), the client application 456 in step 720, if applicable, updates the DRM data set of the digital content item to indicate the transfer of the one or more rights, and again, if applicable, in step 722, sends the updated DRM data set over a network to the DRM reference service application 458. There may be instances such as in streaming examples where a DRM data set for the second user is not created. In the streaming examples, the second user is not receiving a stored copy which he or she can view later or a discount which he or she can use at a different time. User profile data may be updated to identify who the user streams content with as part of profile building. In cases where a complete copy is transferred for storage by the second user, a DRM data set is created. In other embodiments, a DRM data set may be created including the right to receive a streamed copy in the rights data 482. In any event, in step 724, if the one or more rights granted, e.g. right to possession as a result of a loan, right to own as result of a gift or a purchase made, right to stream or give copies to a number of other users and the like, allow transfer of the digital content item, the client side application 456 transfers the digital content item to the see-through, mixed or augmented reality display system 8 of the second user.

In some examples where the digital content item is stored in memory on another user system 461 or stored by the DRM reference service application 458 as part of its content storage services, the client side application 456 may download or stream the digital content item from its stored location over a network and in turn upload or stream, as the rights may allow, to the display device system 8 of the second user. In other examples, a link for accessing the remote storage location of the digital content item may be provided. For example, a link to the digital content item stored in the content 468 stored by the DRM service provider may be forwarded or a link to the storage location on one of the user's systems 461. Security credentials, e.g. a key and a nonce, a username and password, a digital signature key, and the like, may also be provided to the second user with the link which when presented to a client side service application 456N on the user computer system $461_N$ will cause that client application 456N to transfer the copy.

FIGS. 12A and 12B and 13A and 13B provide some illustrative examples of physical actions for offering and accepting content and a right thereto.

Figure 12A:
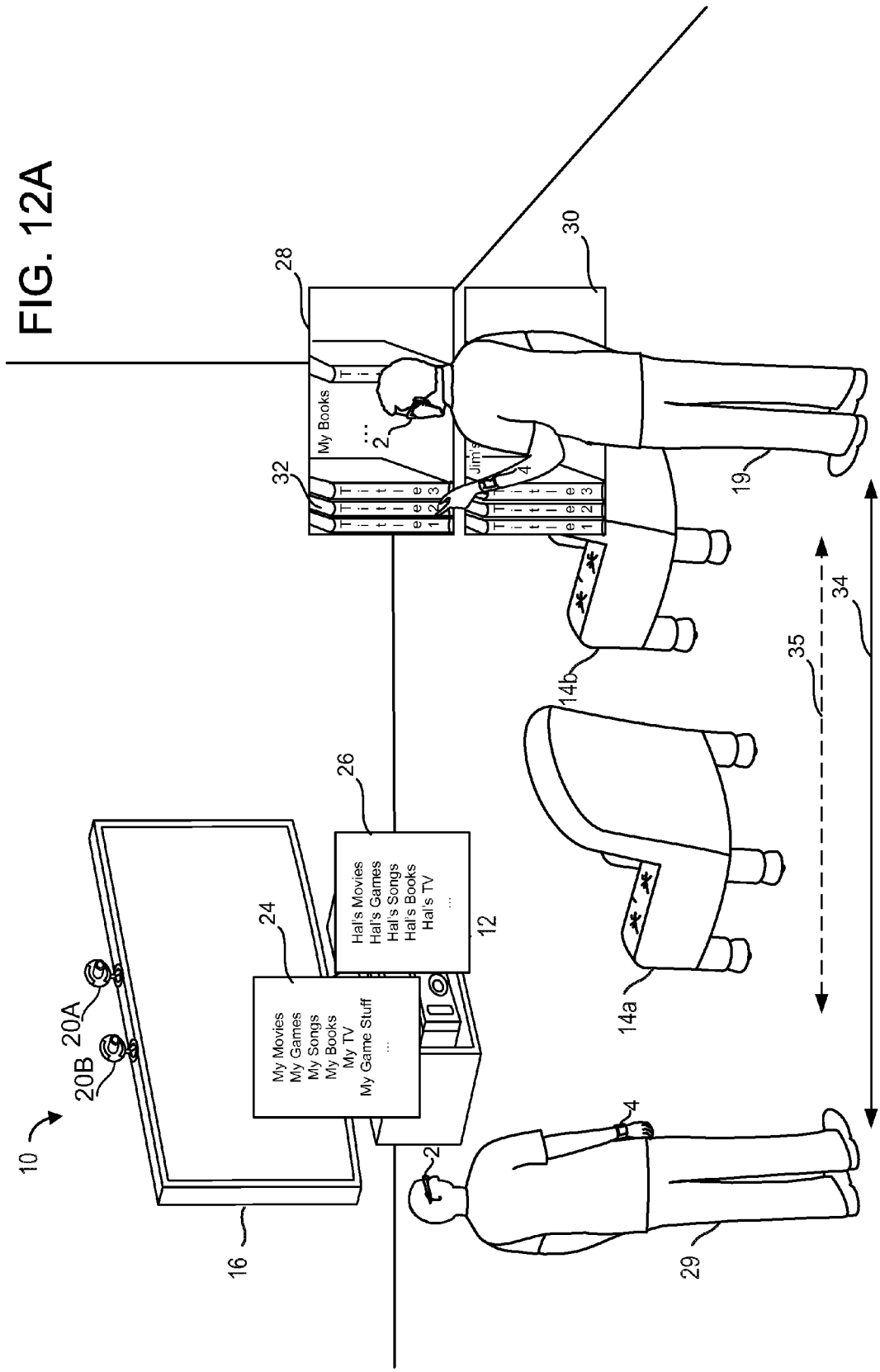
FIG. 12A illustrates an example of a physical action by a user of a gesture for selecting a digital content item from a display of a DRM library displayed in the user field of view of a see-through, augmented reality display device.

FIG. 12A illustrates an example of a physical action by a user of a gesture for selecting a digital content item from a display of a DRM library displayed in the user field of view of a see-through, augmented reality display device. Returning to the example of FIG. 10 in which Hal 19 is viewing his written works, as virtual books 32 "My Books" on a virtual shelf 28 and Jim's virtual books on virtual shelf 30. As illustrated, Hal has moved his hand towards a virtual book object of "Title 2" in front of his display device 2 so the outward facing camera 113 captures image data of the hand and fingers. The client DRM application 456 tracks the position of the virtual books including "Title 2" in the user field of view and of real objects like Hal's hand. With his thumb and index fingers position, Hal 19 has performed a gesture indicating selection of the virtual book labeled "Title 2." The image processing software 451 or the recognizer engine 454 based on a filter 455 recognizes the selection gesture and the client DRM application 456 receives data via user input software 477 identifying the gesture including position data which the application 456 relates to the position of the virtual object, "Title 2." Additionally, (not shown), Hal may pull the virtual object "Title 2" from the shelf which is another gesture indicating selection of the item represented by the virtual object 32. In some examples, the client side DRM service application 456 may prompt the user with messages or menus displayed about transferring a right to the digital content item of Title 2. For example, as discussed below, if gaze data determined from data capture by the eye tracking camera 134 indicates Jim has looked at Title 2 beyond a predetermined time period.

FIG. 12B illustrates an example of gestures and sounds as physical actions of users detected by a see-through, augmented reality display of each user for completing a transfer of a right to a digital content item between the users. In this example, after Hal has selected the virtual object book representing the "Title 2" digital content item, he performs a physical action of saying specific words to indicate a transfer request of a lease to Jim for "Title 2" by saying "Loan 'Title 2' to Jim for 1 month" which is captured by microphone 110 and user input software 477 identifies as a physical action indicating a transfer request of one or more rights for "Title 2." The client side DRM application 456 of Hal's display device system 8 determines from the transfer rules 488 in the DRM data set 474 for "Title 2" whether the loan is permitted. The user profile data 460 of Hal indicates Jim is a social networking friend having a trust level sufficient for a predefined distance 35 which distance 34 is within for a loan of "Title 2." Therefore, the transfer is allowed, and, in this example, a message is sent to Jim's display device system 8 indicating an offer of "Title 2" is being made. Jim performs a grip gesture with respect to the virtual object of "Title 2" while looking at it as shown in FIG. 12B. The eye tracking camera 134 captures the gaze data, the front facing camera 113 captures the grip gesture, and the microphone 110 captures audio data of "I accept." These physical actions indicate acceptance of Hal's offer. The display device system 8 of Jim sends a message to the display device system 8 of Hal confirming the acceptance. Jim's device system 8 then receives an updated DRM data set 474 indicating his lease and its period of 1 month and the content of "Title 2" from Hal's system 8. In this example, each device individually monitors its own user's physical actions in determining an event of a selection, an offer or an acceptance has occurred. For example, while Jim is performing his acceptance actions, the user field of view of Hal's display device 2 is directed back to the libraries 28 and 30. Confirmation of acceptance comes via a message. In other examples discussed below, the client DRM service application 456 of each display device system 8 determines physical actions of both users to complete a transfer.

The edges of Hal's copy of "Title 2" take on a different appearance than the other virtual books. The difference is indicated by a dashed outline of the virtual book edges which indicates the content item has been loaned out. In some examples like this one, Hal does not have access to his leant copy of "Title 2" just as in the situation where he leant a physical book to a friend. The copy may be deleted from his device system 8 by his DRM service application 456. However, an escrow copy may be sent and stored by the DRM reference service application 458. In the case of this embodiment, however, the client side DRM service application 456 executing in Jim's display system 8 will update the DRM data set 474 in one month's time if Jim has not returned "Title 2" and delete his copy. Hal's client application 456 updates the DRM data set 474 for "Title 2" to show Hal is entitled to possession again and retrieves the escrow copy 468 from the DRM reference service application 458. The technology allows the users to enjoy the interaction of transferring a content item as if it were a physical item without the hassle of having to ask for your property back later in order to enjoy it again after the loan period expires.

FIG. 12C illustrates examples of settings for an appearance characteristic of one or more virtual objects to indicate a right associated with each virtual object. In this example of an enlarged view of virtual book shelves 28 and 30 with their virtual books 32, a marker 33 indicates a color indicating a right or the broadest right Hal 19, My Books, or Jim 29, Jim's Books, has to each digital content item represented by a virtual book. Any color code or pattern scheme can be used. In this example, "Title 2" has a red marker indicating Hal owns the content and can gift, sell, loan, stream or share his copy of "Title 2." Yellow for the marker of "Title 1" under "My Books" indicates Hal can stream a number of copies of this title. Blue for "Title 3" of Hal's "My Books" library indicates Hal has a lease to "Title 3." Green for "Title N" indicates Hal has a discount offer for "Title N." In Jim's Book, white for "Title M" indicates Jim owns the content of "Title M" and he can distribute a number of copies. In this example, the details of the rights signified by each marker can be displayed by the display device system 2 capturing a finger appearing to touch the respective marker.

In other embodiments, other visual effects or appearance characteristics can be applied to virtual objects to indicate the rights to the content they represent. For example, the edges of the virtual object can be highlighted in different colors or other visual effects.

In other examples, another user need not be physically present for a transfer. For example, Jim 29 may be at another location. Or Jim may be in a predefined area such as the home of Hal 19 but is in another room with other friends at the present time, but due to his trust level, just having a connection to Hal's wireless access point in his home allows for transfers of rights between the two. Jim is not wearing his display device 2, but via his mobile device 5, as in the examples discussed above, Jim has permitted Hal to view his DRM library as well. In order to offer the loan of "Title 2", Hal performs the grip gesture and his outward facing cameras 113 of his display device system 8 capture image data of Hal's hand moving in a gripped position. The DRM client application 456 based on received data from the depth image processing 450 and recognizer engine 454 or locally image processing software 451 identifies and tracks the gripped virtual object as that representing "Title 2" and tracks Hal's hand moving virtual "Title 2" onto the virtual bookshelf representing "Jim's Books" in the virtual representation of this portion of Jim's DRM library. The client DRM application $456_1$ on Hal's device communicates directly or via the DRM reference service application 458 with the client DRM application 456N on Jim's mobile device 5 to send a message of the offer. Jim may respond with a text or e-mail message. In some cases, Jim may respond with a voice message or live voice, e.g. a telephone call, saying "I accept" which the sound recognition software 478 on Hal's display device system 8 identifies as a physical action indicating acceptance.

In other examples, Jim and Hal may be having a video chat, e.g. using display 16. For the transfer of "Title 2", Hal's display device system 8, his display device 2 and his processing unit 4, can capture data of Hal's physical actions of offer. Additionally, Hal can view the display 16 through his display device 2 to allow capture of image data of one or more gestures by Jim displayed on the screen indicating acceptance of the offer. Audio of Jim may also be used rather than gestures to indicate a response. Hal's microphone 110 can pickup "I accept" from the audio data of Jim being played through the audiovisual display 16. In this way, although they may be having a live conversation from remote locations, they can still transfer rights via physical actions of gestures, voice, eye movements or a combination of these.

Additionally, a predefined distance in some embodiments may be applied with respect to a real-time facial or body digital representation of a live user being controlled by that live user in real-time, for example, from image processing and camera settings, a distance between Hal and the display 16 may be determined to clarify if Hal is within a predefined distance of such a digital representation of Jim. The predefined distance criteria may be determined based on sensor data from transceivers, e.g. WUSB, infrared, Bluetooth, in display 16 and the display device system 8, or based on distances determined from image data based on camera settings like resolution and focal length or depth image data.

In another example, if the computer system 12 is running a depth image processing and skeletal tracking application 451, a recognizer engine 454, sound recognition software 478, facial and pattern recognition software 476, and a client DRM application 456, image data of Hal can be combined with image data of virtual objects, like "Title 2" he manipulates and sent to a computer system Jim is using over a network. If Jim is using his display device system 8, he may see Hal's manipulations of the virtual object at his remote location from his, Jim's perspective, while wearing display device 2.

In some examples, a real-time facial or body digital representation of a live user being controlled by that live user in real-time is an avatar. For example, Jim's movements may be being captured at his location by captures devices 20A and 20B and front facing cameras 113, audio may be captured by a microphone (not shown) on the capture devices 20A and 20B or via microphone 110, and processed by the various software 451, 450, 454, 478, 476, 456 at his location and sent over a network 50 to the processing unit 4,5 and display device 2 of Hal's display device system 2. Similarly, Hal's movements may be being captured at his location by similar capture devices 20A and 20B and front facing cameras 113, audio may be captured by a microphone (not shown) on the capture devices 20A and 20B or via microphone 110, and the various software 451, 450, 454, 478, 476, 456 and sent over a network 50 to Jim's display device system 8. Just as when users play a game over the Internet remotely and control their respective avatars, both Jim and Hal are controlling their respective avatars remotely in gestures and other physical actions which signify selection of virtual objects, as well as offers and acceptances of rights transfers to digital content items.

In other examples, a user may select a virtual object and instead of transferring the object to a physical user or a real-time facial or bodily digital representation of the live user, move the object next to a user name in a list like a contact list or a social networking list. The selected user may then receive a notification, e.g. e-mail of the transfer request which the selected user may respond to via another message.

Figure 13B:
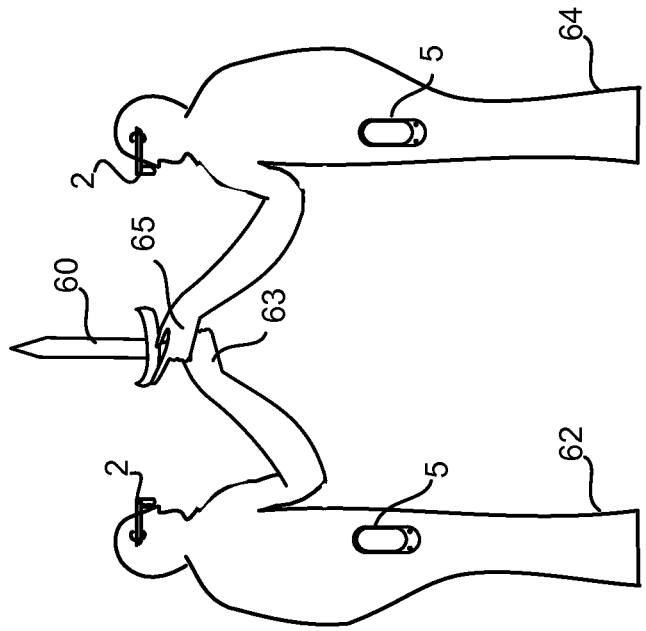
FIG. 13B illustrates examples of physical actions of a first user with respect to a virtual object and a second user indicating an offer of a transfer of a right and examples of physical actions of a second user with respect to the virtual object and the first user accepting the offer.
Figure 13A:
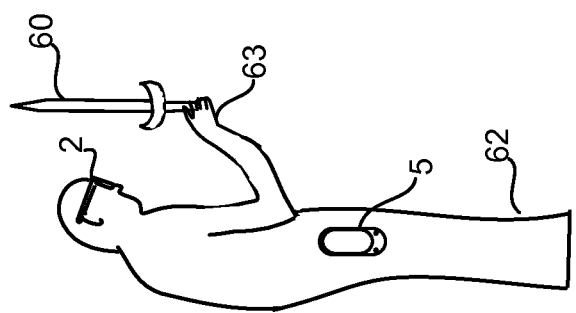
FIG. 13A illustrates an example of a physical action of a user as a gesture for selecting a digital content item.

FIG. 13A illustrates an example of a physical action of a user as a gesture for selecting a digital content item. In this example, a first user 62 selects an avatar accessory of a sword from a library portion of his game accessories by gripping the handle of the virtual sword 60 while looking at the object 60 and his hand 63 so that data can be captured by the front facing cameras 113 of the hand for the recognizer engine 454 to identify a grip gesture and data of the user's eyes can be captured by respective eye tracking cameras 134 from which the depth image processing and skeletal tracking software 450 can determine the first user 62 is looking at the virtual sword 60. These actions in this example indicate the first user has selected the virtual sword 60.

FIG. 13B illustrates examples of physical actions of a first user with respect to a virtual object and a second user indicating an offer of a transfer of a right and examples of physical actions of a second user with respect to the virtual object and the first user accepting the offer. The second user is within a predefined distance of the first user and has a trust level allowing his display device system 8 to see virtual objects representing content selected by the first user. In this example, the first user 62 indicates an offer of ownership of the sword to second user 64 by the grip gesture on the sword and looking directly at the second user 64. The display device system 8 of the second user, e.g. device 2 in combination with wirelessly coupled mobile device 5, identifies the offer is being made by the first user by capturing data of the first user looking at the second user and making a grip gesture on the virtual sword. In order to indicate acceptance, the display device system 8 of the second user has to capture data of a grip gesture of the virtual object by the user's hand 65, image data of the first user looking in the direction of the second user, gaze data indicating the second user 64 is looking at the first user 62 while capturing data of the first user 62 taking his hand away from the virtual sword 60. The combination of the sequence of hand motions in combination with data indicating eye contact for a predetermined time period indicates deliberate motions for a deliberate transfer of rights. Specific gestures may be used to identify specific rights being transferred. In other examples, spoken words may also be used to define the rights being transferred to avoid embarrassing confusion.

As discussed above, in another embodiment, if the first user 62 and second user 64 were avatars, the predefined distance may be applied between the avatars, and the predefined distance determined from relative positions of objects in the image data and camera settings like resolution and focal length or depth image data and the location of the virtual avatars in relation to the real objects in the image data.

In some situations such as shopping or perusing a friends content items stored in physical media, a user may want find out how to get a copy, physical or real, of a selected content item. For example, what deals are out there for a copy of the content item.

FIG. 14A is a flowchart of an embodiment of a method for requesting an offer of a right to a content item, digital or embodied in a physical medium. The user input software 744 in step 732 receiving data identifying at least one physical action of a user selecting a content object of interest. For example, based on a user holding a DVD or book as captured in image data from the front facing camera 113 or environment cameras like capture devices 20A and 20B, the input software 477 receives indication of a selection gesture like a grip or hold from the DRM application 456 as determined by local image processing software 451 or the remotely executing recognizer engine software 454. Additionally, the physical action may be a gaze which has fixated on the object beyond a time period. In some embodiments, the display device system 8 may display a message asking the user if he or she is interested in obtaining a copy of the content item. In step 734, data is received identifying at least one physical action indicating a request for one or more offers of rights to the content item represented by the content object of interest. Again, some examples of physical actions may be spoken words, eye movements or physical gestures. In step 736, the client application 456 sends a request to the DRM reference service application 458 over a network, and in step 738, the client application 456 receives one or more offers of rights to the content item from the DRM reference service application 458 over a network 50 which are displayed to the user.

In one example, the right requested is for a digital version of a content item the user owns a copy of in a physical medium. The user may be instructed to find and look at a unique identifier on the physical medium like a Uniform Product Code (UPC), and the DRM service makes an offer of providing a digital downloadable copy or a streamed copy. This digital copy if stored as content 468 by the service is accessible wherever the user has network access to the DRM reference service application 458.

FIG. 14B is a flowchart of an embodiment of a method for accepting an offer of a right to a content item, digital or embodied in a physical medium. In step 740, the user input software 477 receives data identifying at least one physical action indicating user input accepting an offer or one or more rights for the content item which is communicated to the client DRM application 456 which in step 742, receives a DRM data set 474 for the content item including the one or more rights for the content item. In step 744, if the one or more rights allow digital transfer of the content item, a digital version of the content item is transferred to the see-through, mixed reality display system of the user from the offeror, for example a content provider computer system 52 such as a retailer or direct producer. In step 746, the client application 456 sends the DRM data set for the content item over a network 50 to the DRM reference service application 458 for updating the DRM library of the user.

Figure 15A:
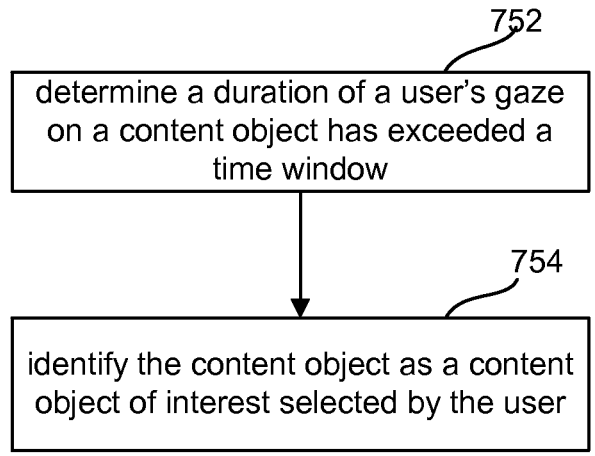
FIG. 15A is a flowchart of an embodiment of a method for identifying at least one physical action of a user's eye selecting a content object of interest.

FIG. 15A is a flowchart of an embodiment of a method for identifying at least one physical action of a user's eye selecting a content object of interest. In this example, the user input software 477 which analyzes gaze data determines in step 752 that adoration of a user's gaze on a content object has exceeded a time window and in step 754 identifies the content object as a content object of interest selected by the user.

Figure 15B:
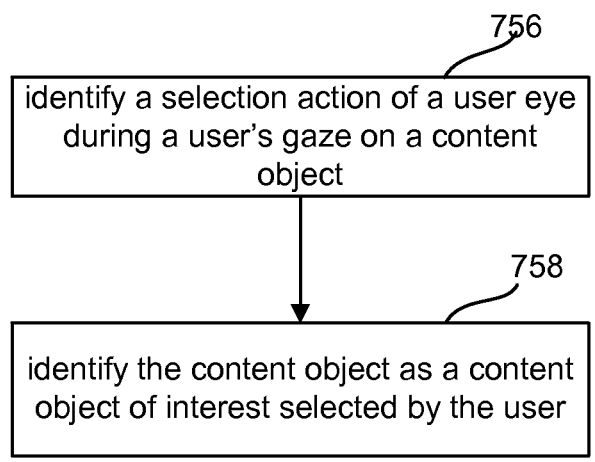
FIG. 15B is a flowchart of another embodiment of a method for identifying at least one physical action of a user's eye selecting a content object of interest.

FIG. 15B is a flowchart of another embodiment of a method for identifying at least one physical action of a user's eye selecting a content object of interest. In this example, the user input software 477 in step 756 identifies a selection action of a user eye during a user's gaze on a content object and in step 758 identifies the content object as a content object of interest selected by the user. An example of a selection action of a user eye is a blinking motion or sequence. In another example, it may be a sequence of pupil movements in up down or side to side movements detected in image data from the eye tracking cameras 134 or in sensor data from the electrical impulse sensors 128.

Figure 16:
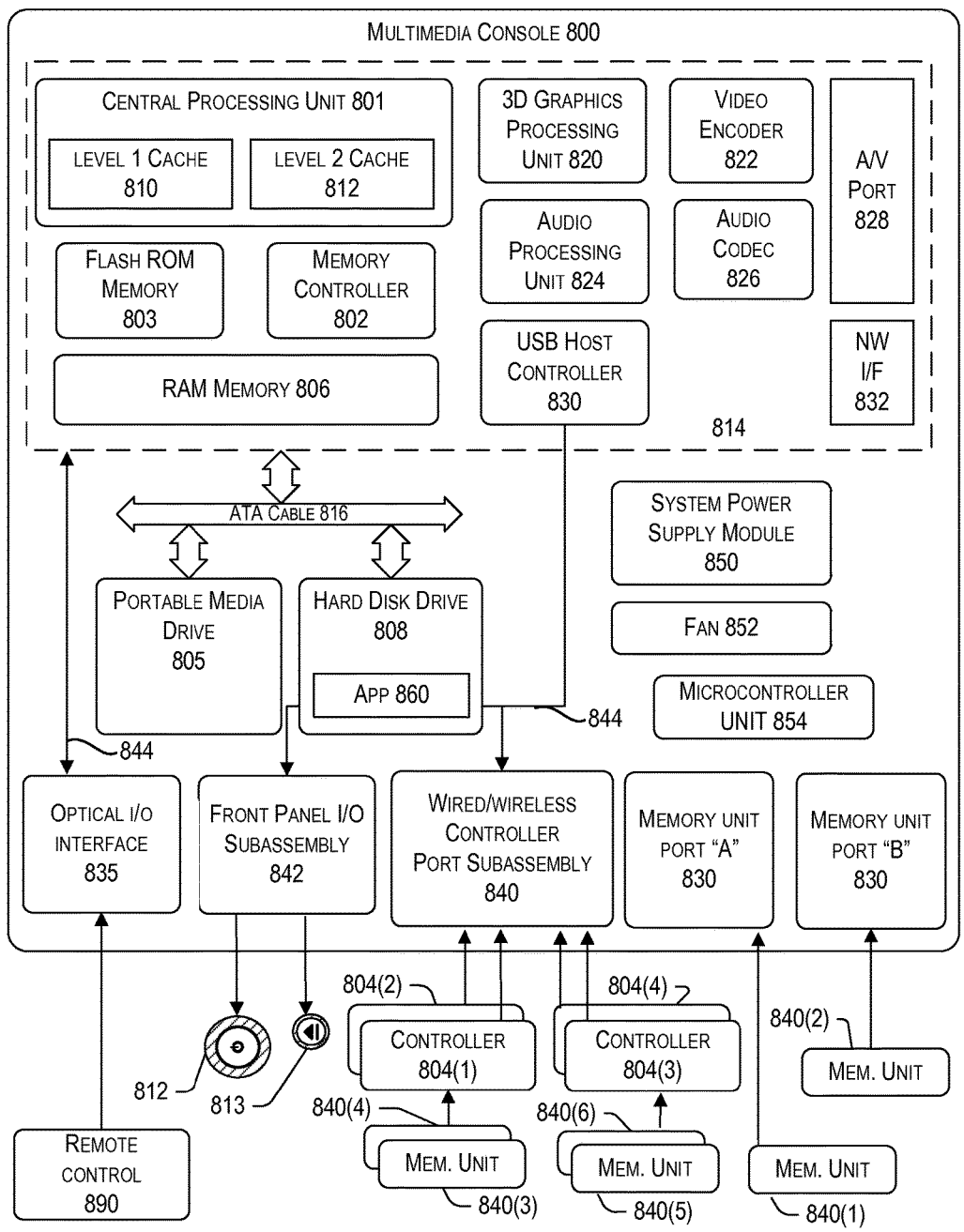
FIG. 16 is a block diagram of one embodiment of a computing system that can be used to implement a network accessible computing system hosting a reference DRM service application.

FIG. 16 is a block diagram of one embodiment of a computing system that can be used to implement the hub computing system of FIGS. 1A and 1B. In this embodiment, the computing system is a multimedia console 800, such as a gaming console. As shown in FIG. 16, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 16 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 16 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An augmented reality display system comprising:
a first image generation unit configured to display an image of a virtual object associated with a contractually-defined existing or new legal right of a first user, the display of the virtual object occurring within a first field of view of the first user;
a sensor configured to detect a physical action by a body part of the first user and to produce first user action data, the detectable physical action being one that can be directed to the virtual object;
a processor configured to receive the first user action data and to determine if the physical action is directed to the virtual object such that it is indicative of a request for a change of legal status for at least the first user with respect to the contractually-defined existing or new legal right associated with the virtual object that the physical action was directed to; and
a memory accessible by the processor and storing data representing rules governing change of legal status for at least the first user with respect to the contractually-defined existing or new legal right associated with the virtual object;
wherein the processor is configured to determine whether an indicated request for a change of legal status for at least the first user with respect to the contractually-defined existing or new legal right associated with the virtual object complies with, and thus is permitted by the represented rules governing the requested change of legal status; and
wherein responsive to a determination that the indicated request for the change of legal status is permitted, the processor is configured to record the requested and permitted change of legal status in the memory.

2. The system of claim 1 further comprising
a network interface configured to provide communication between network linked portions of the system where the network linked portions of the system include said first image generation unit and further include a second image generation unit corresponding to a second user where the second image generation unit is configured to display an image of the virtual object as being associated with a contractually-defined existing or new legal right of the second user;
the network interface being configured to further provide communication with a computer system that is configured to provide legal rights management and to maintain the rules as applicable at least for the first user; and
the processor further configured to request and receive the maintained rules for at least the first user.

3. The system of claim 2 further comprising:
an additional sensor configured to detect a physical action by the second user and to produce second user action data, the detectable physical action by the second user being one that can be directed to the virtual object;
a processor configured to receive the second user action data and determine if the physical action performed by a pre-specified body part of the second user and directed to the virtual object is indicative of a request for a change of the contractually-defined legal status for at least the second user with respect to the existing or new legal right associated with the virtual object.

4. The system of claim 3 wherein:
the processor is further configured to receive location data indicative of respective locations of avatars of the first and second users and for determining whether the indicated respective locations of the avatars conform to a predetermined maximum distance permitted by the maintained rules for effectuating a correspondingly requested change of legal status for at least one of the first and second users.

5. The system of claim 1 wherein the rules comprise:
identification of one or more changeable rights currently assigned to the first user; and
definition of one or more predefined distances associated with the first user that are determinative of whether a correspondingly indicated request for a change of legal status for at least the first user with respect to the existing or new legal right associated with the virtual object can take place.

6. The system of claim 5 wherein a respective definition of the one or more predefined distances is based on at least one of the following:
a real world location of the first user;
a virtual world location of an avatar of the first user;
an identity of a second user with whom the first user is interacting; and
an identification of a trust relationship associated with the identity of the second user.

7. The system of claim 1 wherein the virtual object is a three dimensional virtual object.

8. A machine-implemented method for causing change of a contractually-defined legal status for at least a first user of a machine system, the method comprising:
displaying to at least the first user, by at least a first see-through, augmented reality display device, one or more virtual objects respectively associated with a contractually-defined existing or new legal rights of the first user;
sensing one or more physical actions by a corresponding one or more of pre-specified body parts of the first user that are directed to the one or more virtual objects and producing first user action data indicative of which of the one or more of the physical actions was sensed;
determining, based on the first user action data, of whether the sensed one or more physical actions performed by a corresponding one or more of the pre-specified body parts of the first user with respect to a corresponding one or more of the displayed virtual objects is indicative of a request for a change of legal status for at least the first user with respect to the contractually-defined existing or new legal rights associated with the one or more virtual objects;
accessing stored data representing rules governing change of legal status for at least the first user with respect to the contractually-defined existing or new legal rights associated with the virtual object and indicating whether the requested change can take place; and
responsive to a determination, based on the rules, that the indicated request for the change of legal status is allowed, recording the requested change of legal status in a memory that is pre-specified as storing current legal status.

9. The method of claim 8 further comprising displaying by way of the first see-through, augmented reality display device a moving of a position of at least one of the virtual objects in accordance with the first user action data.

10. The method of claim 8 wherein
the one or more virtual objects are three-dimensional (3D) virtual objects, each having an appearance of being integrated with real world objects seen through the first see-through, augmented reality display device.

11. The method of claim 8 wherein the accessing of stored data representing said rules is further accompanied by at least one of:
detecting a real world location of the first user and determining if the location is in compliance with the accessed rules;
detecting a virtual world location of an avatar of the first user and determining if the detected location is in compliance with the accessed rules;
determining one or more distances associated with the first user and determining if the determined one or more distances are in compliance with the accessed rules;
determining an identity of at least a second user with whom the first user is interacting and determining if the identity is in compliance with the accessed rules;
determining a trust level of the second user based on the determined identity of the second user and determining if the trust level is in compliance with the accessed rules; and
determining whether the rules permit the indicated as requested change of legal status to take place.

12. The method of claim 11 wherein the recording of the requested change of legal status as having taken place comprises:
updating a stored data set representing rights associated with identified persons to indicate the change of legal status of the first user; and
sending the updated data set over a network to a rights management service for correspondingly updating a managed rights record of the first user.

13. The method of claim 12 further comprises:
determining whether there is a physical action of the second user indicating acceptance of the indicated as requested change of legal status for the first user.

14. The method of claim 8 wherein determining, based on the first user action data, of whether the one or more physical actions is indicative of a request for a change of legal status for at least the first user comprises at least one of the following:
identifying one or more hand positions of the first user;
identifying one or more hand movements of the first user;
identifying an action of an eye of the first user; and
identifying a sound spoken by the first user.

15. One or more processor readable, hardware storage media having stored thereon processor readable and executable instructions for implementing a method effectuating a change of legal status of a first user using a first see-through, augmented reality display device, the method comprising:
sensing of one or more physical actions by a corresponding one or more body parts of the first user and causing production of corresponding first user action data indicative of which of the one or more physical actions by which of the body parts of the first user was sensed;
displaying by way of the first see-through, augmented reality display device to at least the first user of one or more virtual objects respectively associated with contractually-defined existing or new legal rights of the first user;
determining, based on the first user action data, of whether one or more physical actions performed by a pre-specified one or more body parts of the first user are directed to the one or more of the displayed virtual objects associated with contractually-defined existing or new legal rights of the first user and are indicative of a request for a change of legal status for at least the first user with respect to the contractually-defined existing or new legal rights associated with the one or more virtual objects to which the determined one or more physical actions are directed to;
testing stored data representing rules governing how and when change of legal status for at least the first user with respect to the contractually-defined existing or new legal rights associated with the virtual object can take place; and
responsive to a determination, based on the rules, that the indicated request for the change of legal status can take place, recording in a memory that is pre-specified as storing current legal status, the requested change of legal status as having taken place.

16. The one or more processor readable storage media of claim 15, wherein the testing of stored data representing said rules comprises at least one of:
detecting of real world location of the first user;
detecting a virtual world location of an avatar of the first user;
determining one or more distances associated with the first user;
determining an identity of at least a second user with whom the first user is interacting;
determining of trust level of the second user based on the determined identity of the second user; and determining whether the rules permit the indicated as requested change of legal status to take place based on the determined trust level of the second user.

\* \* \* \* \*